(12) United States Patent
Boding et al.

(10) Patent No.: US 9,971,992 B2
(45) Date of Patent: *May 15, 2018

(54) FRAUD DETECTION SYSTEM AUTOMATIC RULE POPULATION ENGINE

(71) Applicant: VISA INTERNATIONAL SERVICE ASSOCIATION, San Francisco, CA (US)

(72) Inventors: B. Scott Boding, Mountain View, CA (US); Cory H. Siddens, Mt. View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/666,932

(22) Filed: Aug. 2, 2017

(65) Prior Publication Data

US 2017/0330146 A1 Nov. 16, 2017

Related U.S. Application Data

(63) Continuation of application No. 13/458,910, filed on Apr. 27, 2012, now Pat. No. 9,760,861.

(60) Provisional application No. 61/481,139, filed on Apr. 29, 2011.

(51) Int. Cl.
*G06Q 20/40* (2012.01)
*G06Q 30/00* (2012.01)
*G06Q 20/38* (2012.01)
*G06Q 20/32* (2012.01)
*G06Q 10/10* (2012.01)
*G06Q 40/02* (2012.01)
*G06Q 20/36* (2012.01)

(52) U.S. Cl.
CPC ............. *G06Q 10/10* (2013.01); *G06Q 40/02* (2013.01); *G06Q 20/3674* (2013.01); *G06Q 20/405* (2013.01); *G06Q 20/4016* (2013.01)

(58) Field of Classification Search
USPC ................. 705/38, 44, 318, 67, 76, 18, 7.28
See application file for complete search history.

(56) References Cited

U.S. PATENT DOCUMENTS

| | | | |
|---|---|---|---|
| 7,263,506 B2 | 8/2007 | Lee et al. | |
| 7,433,855 B2 * | 10/2008 | Gavan et al. | .................. 706/47 |
| 7,578,438 B2 | 8/2009 | Hogg et al. | |
| 7,657,482 B1 | 2/2010 | Shirey et al. | |
| 8,082,349 B1 | 12/2011 | Bhargava et al. | |
| 2003/0153299 A1 | 8/2003 | Perfit et al. | |
| 2007/0039049 A1 | 2/2007 | Kupferman et al. | |

(Continued)

OTHER PUBLICATIONS

Notice of Allowance dated Jan. 8, 2015, U.S. Appl. No. 13/451,431, 10 pages.

(Continued)

*Primary Examiner* — Mark A Fleischer
(74) *Attorney, Agent, or Firm* — Kilpatrick Townsend & Stockton LLP

(57) ABSTRACT

Embodiments of the invention are directed to a fraud detection system that stores fraud detection rules and merchant profiles. The fraud detection system allows a user to designate fraud detection rules as core fraud detection rules, and the fraud detection system can automatically populate new merchant profiles with the user's core fraud detection rules.

20 Claims, 22 Drawing Sheets

(56) References Cited

U.S. PATENT DOCUMENTS

| | | |
|---|---|---|
| 2008/0162396 A1 | 7/2008 | Kerley et al. |
| 2008/0288382 A1 | 11/2008 | Smith et al. |
| 2008/0298573 A1 | 12/2008 | Monk |
| 2008/0313047 A1 | 12/2008 | Casares et al. |
| 2010/0017328 A1* | 1/2010 | Stephen et al. ................. 705/43 |
| 2010/0094765 A1* | 4/2010 | Nandy ......................... 705/317 |
| 2010/0138340 A1 | 6/2010 | Shirey et al. |
| 2010/0312705 A1 | 12/2010 | Caruso et al. |
| 2011/0016041 A1 | 1/2011 | Scragg |
| 2011/0016052 A1* | 1/2011 | Scragg .......................... 705/44 |
| 2012/0271743 A1 | 10/2012 | Patel et al. |
| 2013/0024371 A1 | 1/2013 | Hariramani et al. |

OTHER PUBLICATIONS

Final Office Action dated May 23, 2014, U.S. Appl. No. 13/451,431, 11 pages.

Non-final Office Action dated Sep. 4, 2013, U.S. Appl. No. 13/451,431, 11 pages.

Ashish Vikram; A Solution Architecture for Financial Institutions to Handle Illegal Activities: A Neural Networks Approach; 2004: IEEE: pp. 1-10.

Final Office Action dated Dec. 29, 2016, U.S. Appl. No. 13/458,910.

Non-final Office Action dated Oct. 22, 2014, U.S. Appl. No. 13/458,910, 10 pages.

Non-final Office Action dated Apr. 8, 2013, U.S. Appl. No. 13/458,910, 9 pages.

* cited by examiner

Rule Editor

Rule Definition

Name and describe your rule appropriately below.

911 — Name*

912 — Description*

*Required Fields

913 — Category [Uncategorized ▼]

914 — ☐ Core Rule: set rule to [Monitor ▼] in the profiles added with core rules.
915

934 — [Copy Rule]  935 — [Delete Rule]

910

Rule Conditions

921

This rule is true if: ● all conditions below are true   ○ at least one condition below is true

Add Condition

To add a condition, select an order element to evaluate, a comparison operator, and a comparison value. The order element selected determines the available comparison options.

Order Element*
[▼]
922

[OK]
926

920

[Edit Rule Configuration in Profiles] — 930

[Save] [Cancel] [Apply]
 931    932     933

Rule Editor

Rule Definition

Name and describe your rule appropriately below.

1011 — Name*

1012 — Description*

*Required Fields*

1013 — Category [Uncategorized ▼]

1014 — ☐ Core Rule: set rule to [Monitor ▼] in the profiles added with core rules.

1015

1034 — [Copy Rule]  1035 — [Delete Rule]

1010

Rule Conditions

1021 — This rule is true if: ● all conditions below are true   ○ at least one condition below is true

Add Condition

To add a condition, select an order element to evaluate, a comparison operator, and a comparison value. The order element selected determines the available comparison options.

Order Element*         Comparison Operator*    Comparison Value(s)*
[Shipping city ▼]      [contains ▼]            Custom Value
                                               Billing city
1022                   1023                    Decoded IP city
                                               True IP address city
                                               *Custom Lists*

1025                                           1024

Custom Value:
[Cupertino]            1026              [OK]

To compare custom lists, use commas to delimit the comparison values.

[Edit Rule Configuration in Profiles] — 1030

[Save]  [Cancel]  [Apply]
1031    1032     1033

Rule Editor

Rule Definition — 1110

Name and describe your rule appropriately below.

1111 — Name*  [            ]

1112 — Description*  [                    ]

*Required Fields

1113 — Category  [Uncategorized ▼]

1114 — ☐ Core Rule: set rule to [Monitor ▼] in the profiles added with core rules.

1115

1134 — [Copy Rule]   1135 — [Delete Rule]

Rule Conditions — 1120

1121 — This rule is true if:  ● all conditions below are true   ○ at least one condition below is true

[ Shipping city contains "Cupertino"                                               ✎ ]

[ Amount (Grand Total) is greater than 500 USD. Applies to orders in all currencies.  ✎ ]

1126 — [Add New Condition]

1130 — [Edit Rule Configuration in Profiles]

1131 — [Save]   1132 — [Cancel]   1133 — [Apply]

Rule Editor

Rule Definition

Name and describe your rule appropriately below.

1211 — Name*: Cupertino Orders
1212 — Description*: Orders shipping to Cupertino 1213 — Category: Consumer Data Validation 1214 — ☑ Core Rule: set rule to [Monitor ▼] in the profiles added with core rules.
  - Accept
  - Reject
  - Review
  - Monitor

1215

1234 — Copy Rule    1235 — Delete Rule

1210

* Required Fields

Rule Conditions

1221 — This rule is true if  ● all conditions below are true   ○ at least one condition below is true Shipping city contains "Cupertino"
Amount (Grand Total) is greater than 500 USD. Applies to orders in all currencies.

1226 — Add New Condition

1220

1230 — Edit Rule Configuration in Profiles

1231 — Save    1232 — Cancel    1233 — Apply

Custom Rules  1321  1322  1323

ADDRESS VERIFICATION (4)

| c | Name | Description | | |
|---|---|---|---|---|
| c | Account issued outside of billing country | Account issued in country other than country in customer's billing add. | ✎ | ☐ |
| c | AVS service not available | AVS service not available | ✎ | ☐ |
| c | No AVS match | Neither the street address nor the postal code matches. | ✎ | ☐ |
| c | Partial AVS match | Either the street address or the postal code matches. | ✎ | ☐ |

CARD VERIFICATION NUMBER (4)

| c | Name | Description | | |
|---|---|---|---|---|
| c | CVN not submitted | Card verification number was not submitted | ✎ | ☐ |
| c | CVN not supported by cardholder's bank | Card verification number not supported by cardholder's bank. | ✎ | ☐ |
| c | CVN service not available | Card verification number is not available. | ✎ | ☐ |
| c | No CVN match | Card verification number does not match bank data. | ✎ | ☐ |

CONSUMER DATA VALIDATION (5)

| c | Name | Description | | |
|---|---|---|---|---|
| c | Free e-mail provider | Free e-mail provider. | ✎ | ☐ |
| c | Suspicious telephone number | Suspicious telephone number. | ✎ | ☐ |
| c | Suspiciously high number of account numbers | Suspiciously high number of account numbers. | ✎ | ☐ |
| c | Suspiciously high number of different e-mail addresses | Suspiciously high number of different e-mail addresses. | ✎ | ☐ |
| c | Cupertino Orders | Ordering shipping to Cupertino | ✎ | ☐ |

} 1320

ORDER DATA QUALITY (7) ▶

OTHER TESTS (3) ▶

PAYER AUTHENTICATION (2) ▶

VELOCITY (3) ▶

UNCATEGORIZED (1) ▶

[Add Category] ~1324          1325~ [Add Rule] [Delete Rule(s)] ~1326

Profile Editor

Profile Definition — 1610
- Name* [_____]  *Required Fields
- Description [_____]
- Priority [3 ▼]

Queue Selection — 1620
- Send orders for review to [Example ▼]
- Send rejected orders to [Example ▼]

Fraud Score — 1630
Select an appropriate risk model and score threshold below based upon your business.
- Risk Model [Customer's billing country ▼]
- ☐ Enable Score Thresholds
  - Ignore (0 to 39) | Review (40 to 70) | Reject (71 to 99)
  - 0  10  20  30  40  50  60  70  80  90  100

Rules — 1640

☐ ADDRESS VERIFICATION (4 of 4 applied) ▼

| Monitor | Accept | Review | Reject | Priority | Rule |
|---|---|---|---|---|---|
| ☑ | ☐ | ☐ | ☐ | ▼ | Account issued outside of billing country |
| ☑ | ☐ | ☐ | ☐ | ▼ | AVS service not available |
| ☑ | ☐ | ☐ | ☐ | ▼ | No AVS match |
| ☑ | ☐ | ☐ | ☐ | ▼ | Partial AVS match |

☐ ADDRESS VERIFICATION (4 of 4 applied) ▼

| Monitor | Accept | Review | Reject | Priority | Rule |
|---|---|---|---|---|---|
| ☐ | ☐ | ☑ | ☐ | ▼ | Account issued outside of billing country |
| ☐ | ☐ | ☑ | ☐ | ▼ | AVS service not available |
| ☐ | ☐ | ☑ | ☐ | ▼ | No AVS match |
| ☑ | ☐ | ☐ | ☐ | ▼ | Partial AVS match |

☐ CARD VERIFICATION NUMBER (4 of 4 applied) ▶

☐ CONSUMER DATA VALIDATION (5 of 5 applied) ▶

☐ ORDER DATA QUALITY (7 of 7 applied) ▶

☐ OTHER TESTS (3 of 3 applied) ▶

☐ PAYER AUTHENTICATION (2 of 2 applied) ▶

☐ VELOCITY (3 of 3 applied)

[View All Rule(s)] 1641    [Create Custom Rule] 1642

[Save] 1601   [Cancel] 1602   [Apply] 1603

Rule Editor

Copy Rule | Delete Rule

Rule Definition

Name and describe your rule appropriately below.

2011 — Name* [CVN not submitted]

2012 — Description* [Card verification number was not submitted.]

*Required Fields

2013 — Category [Card Verification Number ▼]

2014 — ☑ Core Rule: set rule to [Monitor ▼] in the profiles added with core rules. — 2015

Rule Conditions

2021 — This rule is true if: ○ all conditions below are true  ● at least one condition below is true Authorization card verification results is not present ✎

Authorization card verification result is equal to "CVN on card but not included in request" ✎

[Edit Rule Configuration in Profiles] — 2030

[Save] [Cancel] [Apply]
2031    2032    2033

FIG. 20

Rule Editor

Rule Definition

Name and describe your rule appropriately below.

Name* [CVN not submitted]

Rule Configuration in Profiles (6 of 9)

Manage this rule's configuration across all profiles

| Profile Name | Monitor | Accept | Review | Reject | Priority |
|---|---|---|---|---|---|
| ABC review | ☐ | ☐ | ☑ | ☐ | ▸ |
| High Risk | ☑ | ☐ | ☐ | ☐ | ▸ |
| Low Risk | ☐ | ☐ | ☐ | ☐ | ▸ |
| Main Profile | ☑ | ☐ | ☐ | ☐ | ▸ |
| Audit Test | ☑ | ☐ | ☐ | ☐ | ▸ |
| Demo Profile | ☑ | ☐ | ☐ | ☐ | ▸ |
| Profile A | ☐ | ☐ | ☐ | ☐ | ▸ |
| Profile B | ☑ | ☐ | ☐ | ☐ | ▸ |
| Profile C | ☐ | ☐ | ☐ | ☐ | ▸ |

*Required Fields

[Update] 2113    [Cancel] 2114

Rule Conditions

This rule is true if:

Authorization ca
Authorization ca

[Edit Rule Configu]    [Copy Rule] [Delete Rule]    [Apply]

FRAUD DETECTION SYSTEM AUTOMATIC RULE POPULATION ENGINE

CROSS-REFERENCES TO RELATED APPLICATIONS

This application is a continuation application U.S. patent application Ser. No. 13/458,910, filed Apr. 27, 2017, which is a non-provisional application of and claims the benefit of priority of U.S. Provisional Application No. 61/481,139, filed on Apr. 29, 2011, which is herein incorporated by references in its entirety for all purposes.

BACKGROUND

As conducting transactions over the Internet has become increasingly popular, the problems and challenges that arise for merchants have also increased. Online transactions create greater difficulty in determining which transactions are legitimate and which transactions are fraudulent. Stolen payment data may be used by a fraudster to purchase goods or services from a merchant. The use of stolen payment data may not be immediately detected by the merchant and may not be known until a significant time after the goods or services have been provided to the fraudster. Thus, the resulting fraud can cost the merchant significant amounts of money in the form of lost revenue and lost stock.

Some merchants take it upon themselves to manually review each and every order and expend significant time and resources in order to determine whether transactions are legitimate or fraudulent. As transaction volumes increase, this becomes an increasingly unsustainable model for merchants. As a result, merchants may find it necessary to incorporate an automated fraud detection system into their transaction processing system.

Some fraud detection systems can include fraud detection rules that evaluate transactions and assist merchants in deciding whether a specific transaction should be accepted or rejected.

However, even with sophisticated fraud detection systems in place, a merchant can still be compromised and be responsible for the costs of fraudulent transactions (e.g. the loss of goods and/or the loss of consideration for those goods). For example, a fraud detection rule may have been intentionally or accidentally modified so as to accept transactions that would ordinarily not be accepted or to misidentify transactions that should be rejected. A merchant may need to modify its fraud detection rules, modify its merchant profiles, or create new merchant profiles to address these problems. However, if a merchant has established a large number of merchant profiles to meet its business requirements, managing their merchant profiles can become an unwieldy proposition.

Thus, new and enhanced methods of detecting fraudulent transactions while providing more efficient and time-saving merchant services has become increasingly necessary to provide greater security and functionality.

Embodiments of the invention address the above problems, and other problems, individually and collectively.

BRIEF SUMMARY

Embodiments of the present invention are related to systems and methods for generating fraud detection rules and merchant profiles in a fraud detection system configured to automatically populate merchant profiles with a user's set of core fraud detection rules.

One embodiment of the invention is directed to a method comprising providing fraud detection rules, by a server computer, where each fraud detection rule comprises at least one condition. A selection of fraud detection rules for a first merchant profile for a user is received at the server computer from a client computer. The method may further comprise associating, by the server computer, the selected fraud detection rules as a core fraud detection rules set for the user.

Another embodiment of the invention is directed to a server computer comprising a processor and a non-transitory computer-readable storage medium. The computer readable medium comprises code executable by the processor for implementing a method. The method comprises providing fraud detection rules, by a server computer, where each fraud detection rule comprises at least one condition. A selection of fraud detection rules for a first merchant profile for a user is received at the server computer from a client computer. The method may further comprise associating, by the server computer, the selected fraud detection rules as a core fraud detection rules set for the user.

Another embodiment of the invention is directed to a method comprising receiving, at a client computer, a plurality of fraud detection rules. The method may also comprise selecting, by the client computer, from the plurality of fraud detection rules, a set of fraud detection rules. The set of fraud detection rules may be associated with the user as a core fraud detection rules set.

Another embodiment of the invention is directed to a client computer comprising a processor and a non-transitory computer-readable storage medium. The computer readable medium comprises code executable by the processor for implementing a method. The method comprises receiving, at a client computer, a plurality of fraud detection rules. The method may also comprise selecting, by the client computer, from the plurality of fraud detection rules, a set of fraud detection rules. The set of fraud detection rules may be associated with the user as a core fraud detection rules set.

These and other embodiments of the invention are described in further detail below with reference to the Figures and the Detailed Description.

BRIEF DESCRIPTION OF THE DRAWINGS

FIG. 9 shows a depiction of features of a default rules editor page according to an embodiment of the invention.

FIG. 10 shows a depiction of features of a rules editor page and the steps of creating a new fraud detection rule condition according to an embodiment of the invention.

FIG. 11 shows a depiction of features of a rules editor page and the steps of creating a new fraud detection rule according to an embodiment of the invention.

FIG. 12 shows a depiction of features of a rules editor page and the steps of creating a new fraud detection rule and establishing the new rule as a core fraud detection rule according to an embodiment of the invention.

FIG. 13 shows a depiction of a custom rules page after the creation of a new core fraud detection rule according to an embodiment of the invention.

FIG. 16 shows a depiction of features of a default profile editor page according to an embodiment of the invention.

FIG. 17 shows a depiction of features of a profile editor page and the steps of creating a new merchant profile according to an embodiment of the invention.

FIG. 20 shows a depiction of features of a rules editor page according to an embodiment of the invention.

FIG. 21 shows a depiction of a pop-up window on a rules editor page for configuring fraud detection rules in preexisting merchant profiles according to an embodiment of the invention.

DETAILED DESCRIPTION

Figure 1:
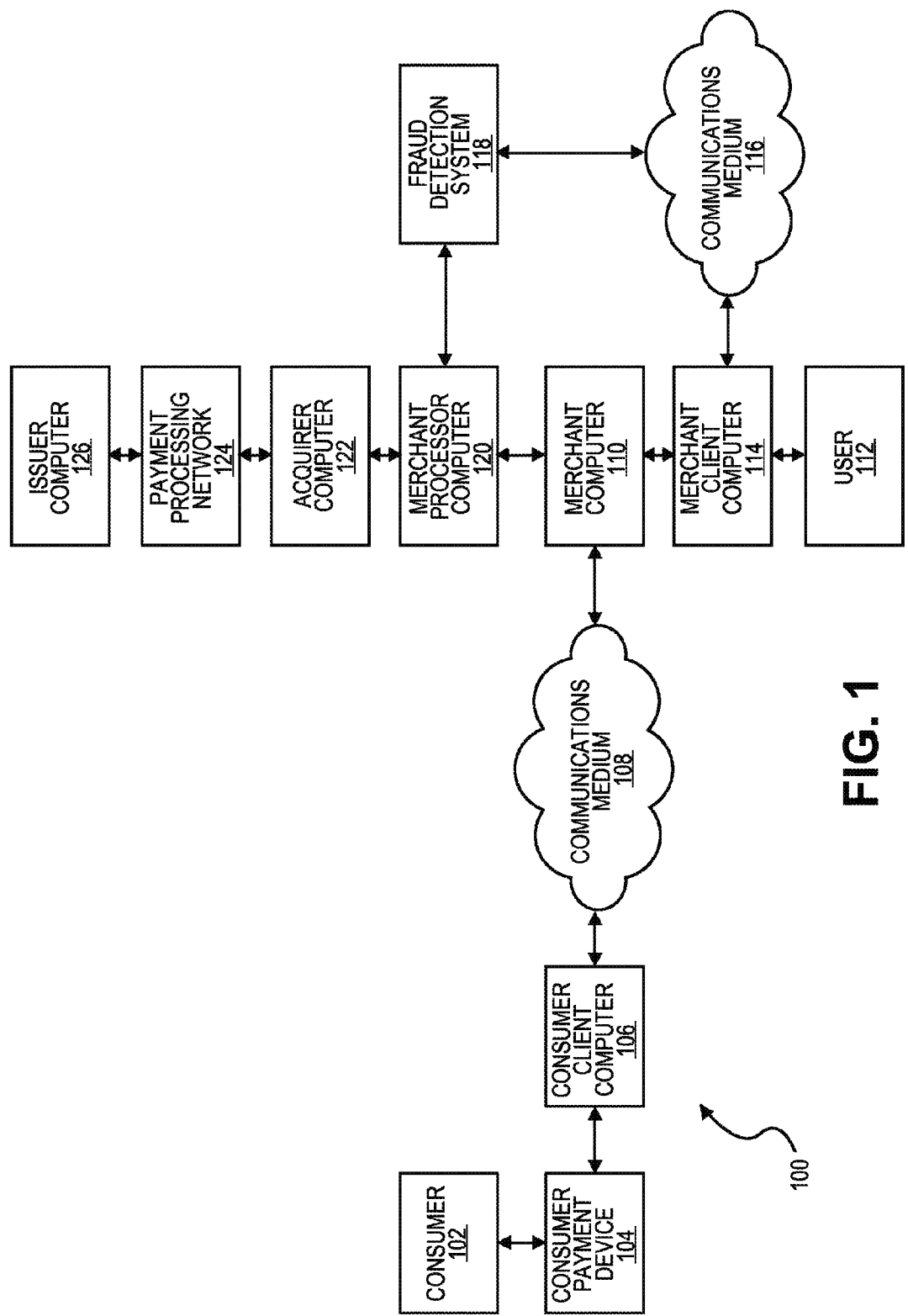
FIG. 1 shows a system diagram of a payment processing system according to an embodiment of the claimed invention.

Prior to discussing embodiments of the invention, descriptions of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "client computer" may include any suitable computational apparatus. The client computer may be an apparatus operated by a consumer, a user associated with a merchant, or any other individual. The client computer may use any suitable wired or wireless network, including the Internet, in order to communicate with other systems. For example, a consumer client computer may be used by a consumer to interact with a merchant Internet storefront in order to conduct a transaction. A merchant client computer may be used by a user associated with a merchant to interact with other merchant computer systems and a fraud detection system.

The term "fraud detection system" may include a single computer or a network of suitable processing entities (e.g., computers) that may have the ability to receive, process and evaluate transaction details to provide fraud detection services. The fraud detection system may have or operate at least a server computer and may include a plurality of databases. The fraud detection system may include a selection of fraud detection rules and merchant profiles that can be created, modified, and/or deleted. The fraud detection system may further record an audit log of modifications made to customizable settings, the selection of fraud detection rules, and merchant profiles that reside within the system. The fraud detection system may also create reports and statistical analyses of the performance of transactions through its system.

The term "fraud detection rule" may refer to a rule in the fraud detection system, and may include a customizable rule. Each fraud detection rule may allow customization as to name, description, category, status as a core fraud detection rule, and for further processes or actions to be taken if the fraud detection rule is triggered. In embodiments of the invention, actions that can be designated for each fraud detection rule can include: accept, reject, review, and/or monitor. Each fraud detection rule may further allow for rule conditions to be established based on a number of criteria. The rule conditions are checked against received transaction details and are used to determine whether a fraud detection rule is triggered.

The term "core fraud detection rule set" may refer to one or more fraud detection rules that a merchant (or user) has marked as being a core fraud detection rule. Once a user has designated one or more fraud detection rules as a core fraud detection rule, the core fraud detection rule set can be automatically populated into new merchant profiles.

The term "user" may refer to an individual or entity who can access the fraud detection system using credentials (e.g. merchant ID, user ID and password) that the individual or entity is authorized to use. As used herein, user may also refer to an individual or entity that is not authorized to access the fraud detection system, but has access to authorized credentials allowing them access to the fraud detection system.

The user can access merchant profiles and fraud detection rules and make modifications to merchant profiles and/or fraud detection rules that are then associated with the user ID logged into the fraud detection system and stored in the fraud rules modification database. The user can also create new merchant profiles, create new fraud detection rules, as well as designate new or existing fraud detection rules as core fraud detection rules.

The term "merchant profile" may include a selection of fraud detection rules and settings established by a merchant (or user) with the fraud detection system. A merchant profile may be added, modified or deleted in the fraud detection system. The merchant profile may include customizable settings for name, profile description, and a selection of fraud detection rules. The merchant profile may also indicate queues into which transactions that are rejected or marked for review are placed for further review. The merchant profile may be associated with one or more users who have access to modify the selection of fraud detection rules contained in the merchant profile. A merchant may have one or more merchant profiles, each comprised of different fraud detection rules as required by the merchant's business.

The term "automatically populate" may refer to an action that can be conducted without direct human interaction. In embodiments of the invention, a core fraud detection rule set can be automatically populated into new merchant profiles by the server computer in the fraud detection system, without requiring the user or merchant to manually enter fraud detection rules or manually select fraud detection rules to load into a new merchant profile. In embodiments, the user can command or direct the fraud detection system to automatically generate a new merchant profile containing the core fraud detection rule set. It can refer to the merchant or user being able to create a new merchant profile that is automatically populated with a pre-existing (or pre-established) core fraud detection rule set. The core fraud detection rule set that is automatically populated into the new merchant profile may be a default set of fraud detection rules as prepared by the fraud detection system or it may be a merchant customized set of fraud detection rules.

The term "database" may include any hardware, software, firmware, or combination of the preceding for storing and facilitating retrieval of information. Also, the database may use any of a variety of data structures, arrangements, and compilations to store and facilitate retrieval of information.

The term "storing" may include recording information regarding a new fraud detection rule or merchant profile and/or regarding a modification to an existing fraud detection rule or existing merchant profile into a database. Storing may also include recording information as to the user ID of a user who effected the modification to the fraud detection rule and/or merchant profile. The storing may be accomplished by the server computer in the fraud detection system and may be stored in a fraud rules modification database, a fraud rules database, and/or a merchant profiles database. For example, if a user creates a new merchant profile with a core fraud detection rule set, the core fraud detection rule set can be stored with the merchant profile in the merchant profiles database. In other embodiments, the core fraud detection rule set can be stored in the fraud rules database and associated with a merchant profile in the merchant profiles database by a user association module. In another example, if another user modifies a fraud detection rule, the name of the rule being modified, the details of the modification, the date and time of the modification, the user ID logged into the fraud detection system, as well as other pertinent information can be recorded in the fraud rules modification database for future purposes.

The term "fraud rules database" may refer to a database containing data that may be used by the fraud detection system. The data in the fraud rules database may include a plurality of fraud detection rules. The fraud rules database may contain default rules prepared and stored by the fraud detection system, and it may contain merchant or user-customized rules. In some embodiments of the invention, when a merchant or user creates a customized core fraud detection rule set, the core fraud detection rule set is stored in the fraud rules database.

The term "merchant profiles database" may refer to a database containing data that may be used by the fraud detection system. The data in the merchant profiles database may include a plurality of merchant profiles. In some embodiments of the invention, when a merchant or user creates a customized core fraud detection rule set and associates the core fraud detection rule set with a merchant profile, the core fraud detection rule set is stored in the merchant profiles database associated with the merchant profile.

I. Systems

Example embodiments are typically implemented in the context of a financial transaction. Therefore, prior to further discussing creating new merchant profiles and automatically populating new and existing merchant profiles with fraud detection rules within a fraud detection system, a brief description of transaction processing will be presented.

An exemplary system 100 for transaction processing can be seen in FIG. 1. The system 100 includes a consumer 102, a consumer payment device 104, a consumer client computer 106, a merchant computer 110, a user 112, a merchant client computer 114, a fraud detection system 118, a merchant processor computer 120, an acquirer computer 122, a payment processing network 124, and an issuer computer 126. In a typical transaction, a consumer 102 may purchase goods or services at a merchant associated with the merchant computer 110 using a consumer payment device 104. The transactions details are then sent to the merchant processor computer 120 and to the acquirer computer 122. The acquirer computer 122 can communicate with an issuer computer 126 via a payment processing network 124 for additional transaction processing. For simplicity of illustration, a certain number of components are shown is shown in FIG. 1. It is understood, however, that embodiments of the invention may include more than one of each component. In addition, some embodiments of the invention may include fewer than all of the components shown in FIG. 1. Also, the components in FIG. 1 may communicate via any suitable communication medium (including the internet), using any suitable communication protocol.

The consumer client computer 106 may communicate with the merchant computer 110 via a communications medium 108, such as a network (e.g. the Internet). Similarly, the merchant client computer 114 may communicate with the fraud detection system 118 via a communications medium 116, such as a network (e.g. the Internet).

The consumer 102 may be an individual, or an organization such as a business, that is capable of purchasing goods or services. The user 112 may be a merchant, an employee of the merchant, or any other individual who has access to the merchant client computer 114.

The consumer payment device 104 may be in any suitable form. For example, suitable consumer payment devices can be hand-held and compact so that it can fit into a consumer's wallet and/or pocket (e.g., pocket-sized). The consumer payment device 104 can include a processor, and memory, input devices, and output devices, operatively coupled to the processor. Specific examples of consumer payment devices include cellular or wireless phones, personal digital assistants (PDAs), pagers, portable computers, smart cards, and the like. The consumer payment devices can also be debit devices (e.g., a debit card), credit devices (e.g., a credit card), or stored value devices (e.g., a pre-paid or stored value card).

The consumer 102 can use the consumer client computer 106, which is communicatively coupled to the merchant computer 110 via the communications medium 108 in order to conduct a transaction with the merchant. The consumer client computer 106 may be in any suitable form. Example of consumer mobile devices include any device capable of accessing the Internet, such as a personal computer, cellular or wireless phones, personal digital assistants (PDAs), tablet PCs, and handheld specialized readers. The consumer client computer 106 transmits data through the communications medium 108 to the merchant computer 110. In some embodiments of the invention, the consumer payment device 106 and the consumer client computer 106 may be a single device.

Figure 2:
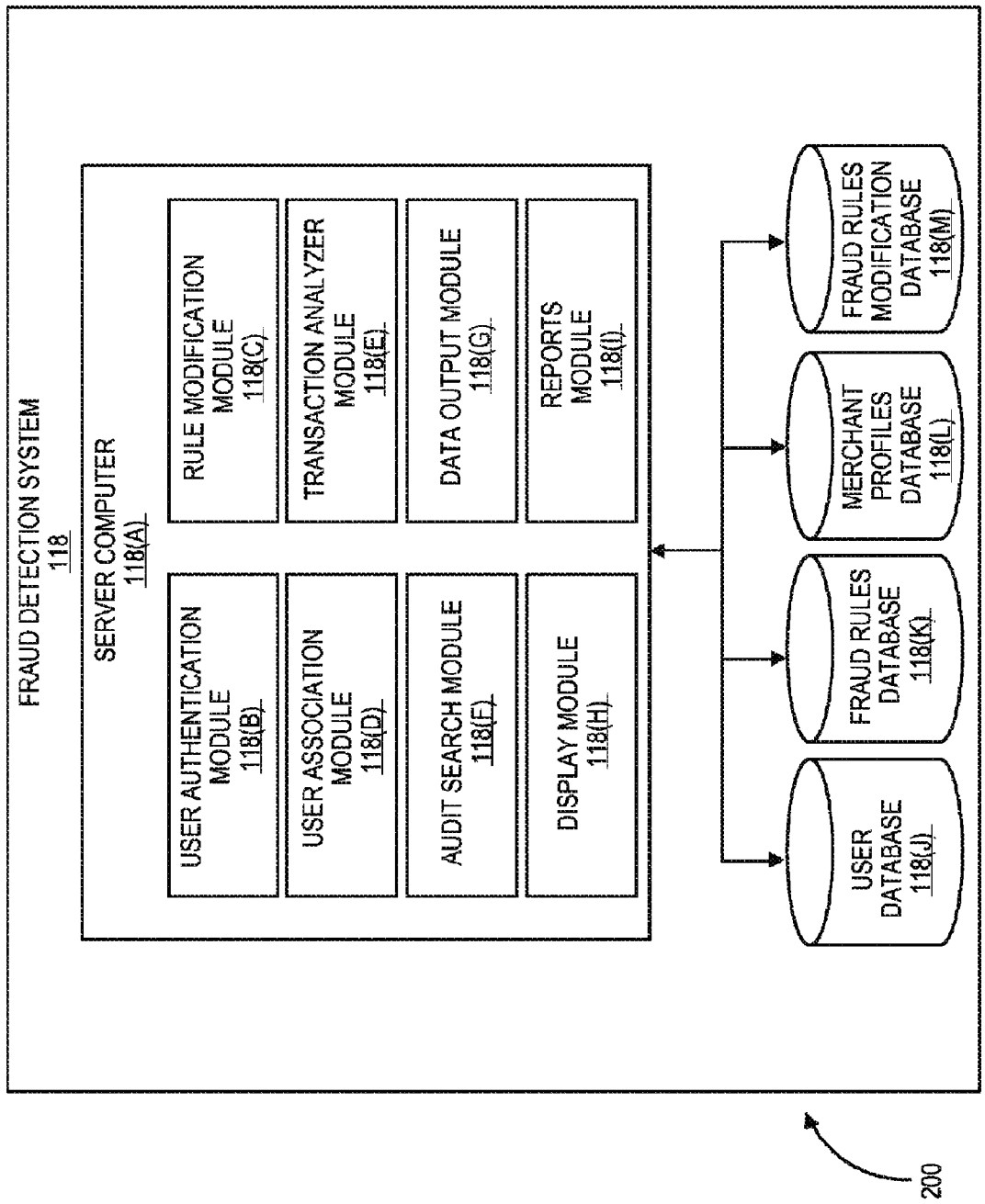
FIG. 2 shows a block diagram of components of a fraud detection system according to an embodiment of the invention.

As depicted in FIG. 2, the fraud detection system 118 may comprise a server computer 118(A) comprising a user authentication module 118(B), a rule modification module 118(C), a user association module 118(D), a transaction analyzer module 118(E), an audit search module 118(F), a data output module 118(G), a display module 118(H), and a reports module 118(I). The various modules may be embodied by computer code, residing on computer readable media.

The server computer 118(A) may be operatively coupled to one or more databases. The one or more databases may comprise a user database 118(J), a fraud rules database 118(K), a merchant profiles database 118(L) and a fraud rules modification database 118(M).

The user authentication module 118(B) handles the verification of the authorization credentials for a user (e.g. merchant ID, user name, password). The user authentication module 118(B) may access a user database 118(J) in determining whether a user 112 seeking access to the fraud detection system 118 is an authorized user. For example, when presented with credentials, the user authentication module 118(B) may access the user database 118(J) to determine whether the provided user name is in the user database 118(J) and whether the provided password corresponds to the password linked to the user name.

The rule modification module 118(C) receives modifications from a user 112 to fraud detection rules or to a merchant profile. The rule modification module 118(C) may also receive modifications in the form of the creation of new merchant profiles or new fraud detection rules. For example, when a user 112 creates a new merchant profile, the rule modification module 118(C) may access the merchant profiles database 118(L) to store the new merchant profile. The rule modification module 118(C) may similarly access the fraud rules database 118(L) to store new fraud detection rules. The rule modification module 118(C) may further access the merchant profiles database 118(L) to store modifications made to a merchant profile. For example, when a user 112 makes a modification, the rule modification module 118(C) may access the merchant profile database 118(L) associated with the authorization credentials entered by the user 112. The rule modification module 118(C) may also access the fraud rules database 118(K) to access pre-established fraud detection rules to add to the merchant profile or to store newly created fraud detection rules created by the user for the merchant profile. In some embodiments of the invention, new fraud detection rules created by the user are stored in the merchant profiles database 118(L) with the corresponding merchant profile.

The user association module 118(D) may associate any modifications made by a user 112 with the authorization credentials entered by the user 112. For example, if the user 112 logged into the fraud detection system 118 with the user name "user1," the user association module 118(D) may record all the modifications made by the user 112, associate the modifications with the user name "user1," and store the data in the fraud rules modification database 118(M). The user association module 118(D) may also associate core fraud detection rule sets with a user and/or merchant profile.

The transaction analyzer module 118(E) may evaluate transaction data received by the fraud detection system 118 from the merchant processor computer 120. In embodiments of the invention, the fraud detection system 118 receives the authorization response message from the merchant processor computer 120 and the message is analyzed by the transaction analyzer module 118(E). If the result from the transaction analyzer module 118(E) is an "ACCEPT", the transaction between the merchant and the consumer 102 can be completed. If the result from the transaction analyzer module 118(E) is a "REJECT", the fraud detection system 118 would return a message to be presented to the consumer 102 that the consumer 102 may be contacted if there are any issues. For example, the consumer may receive a message stating, "Thank you for your order. We will contact you if there are any issues." In embodiments of the invention, the message does not indicate that a "REJECT" was determined for the transaction as the consumer 102 may be attempting to conduct fraudulent transactions. If the result from the transaction analyzer module 118(E) is a "REVIEW", the fraud detection system 118 would "hold" the transaction until it can be further reviewed, and it is determined whether it should be accepted or rejected. In some embodiments, the fraud detection system 118 can automatically invoke a settlement upon an accept decision by the transaction analyzer module 118(E).

The audit search module 118(F) handles the audit log search function of the fraud detection system 118. The audit search module 118(F) receives input from a user 112 comprising search parameters to conduct an audit log search. The audit search module 118(F) processes the search parameters and conducts a search of the fraud rules modification database 118(L).

The data output module 118(G) may output data to be displayed to the user 112. In some embodiments, the data output module may output a set of fraud detection rules or merchant profiles to the user 112. In other embodiments, the data outputted to the user 112 can include the results of an audit log search conducted by the audit search module 118(F)

The display module 118(H) displays the layout of the fraud detection system 118. In embodiments of the invention, the fraud detection system 118 is accessed as a website over a communications medium (e.g. the Internet), via an Internet-enabled device capable of displaying HTML. Other embodiments allow the fraud detection system 118 to be displayed in other suitable manners on other suitable display devices.

The reports module 118(I) compiles the data obtained from the fraud detection system 118 from analyzing transactions. In embodiments of the invention, the reports module 118(I) can provide detailed statistics and data for the merchant on the performance of the merchant's profile and selection of fraud detection rules. For example, the reports module 118(I) can prepare a report indicating the number of times each fraud detection rule was triggered by a transaction. It can further indicate the results of analyzed transactions (e.g. accepted, rejected, or sent for further review). In embodiments of the invention, the reports module 118(I) can present the full transaction details for each transaction received by the fraud detection system 118.

The user database 118(J) may be used by the server computer 118(A) to store authentication elements for users. For example, the user database 118(J) may contain a plurality of merchant IDs and associated user names authorized to access the corresponding merchant profile stored in the merchant profiles database 118(L) in the fraud detection system 118. The user database 118(J) may further store passwords associated with each merchant ID and user name authorized to access the fraud detection system 118.

The fraud rules database 118(K) may be used by the server computer 118(A) to store fraud detection rules that can be added to merchant profiles. In embodiments, a merchant profile can be loaded with pre-existing fraud detection rules contained in the fraud rules database 118(K). The fraud rules database 118(K) may further store new fraud detection rules created by a user 112. The fraud rules database 118(K) may also store a core fraud detection rule set associated with the user 112 that can be accessed and presented to the user 112 when the user 112 requests a new merchant profile to be generated.

The merchant profiles database 118(L) may be used by the server computer 118(A) to store merchant profiles that are customized for each merchant that has created a profile with the fraud detection system 118. In some embodiments, the merchant profile database 118(L) may further store fraud detection rules that have been created for a merchant and associated with a merchant profile.

The fraud rules modification database 118(M) may be used by the server computer 118(A) to store an audit log containing details regarding merchant profiles, fraud detection rules, modifications made to the merchant profiles and fraud detection rules, the creation of new merchant profiles and fraud detection rules, and the user name of the user 112 who made the modifications to the fraud detection rules or merchant profiles. The data stored in the fraud rules modification database 118(M) may be stored by the rule modification module 118(C) and may be searched by the audit search module 118(F).

Returning now to FIG. 1 the user 112 can use the merchant client computer 114, which is communicatively coupled to the fraud detection system 118 via the communications medium 108 in order to access the fraud detection system 118. The merchant client computer 114 may be in any suitable form. Example of merchant client computers include any device capable of accessing the Internet, such as a personal computer, cellular or wireless phones, personal digital assistants (PDAs), tablet PCs, and handheld specialized readers. The merchant client computer 114 transmits data through the communications medium 116 to the fraud detection system 118. In some embodiments of the invention, the merchant computer 110 and the merchant client computer 114 may be a single device.

The merchant computer 110 may be comprised of various modules that may be embodied by computer code, residing on computer readable media. It may include any suitable computational apparatus operated by a merchant. Examples of merchant computers may include an access device or an internet merchant computer. The merchant computer 110 may be in any suitable form. Additional examples of merchant computers include any device capable of accessing the Internet, such as a personal computer, cellular or wireless phones, personal digital assistants (PDAs), tablet PCs, and handheld specialized readers. The merchant computer 110 transmits data through the communications medium 108 to the consumer client computer 106. The merchant computer 110 may also transmit data to a merchant processor computer 120. In embodiments of the invention, the merchant computer 110 receives transaction data from a consumer client computer 106 and transmits the transaction data to the merchant processor computer 120 for fraud evaluation and for further transaction authorization processes. The merchant computer 110 can further communicate with and/or receive input from a merchant client computer 114 operated by a user 112.

Figure 3:
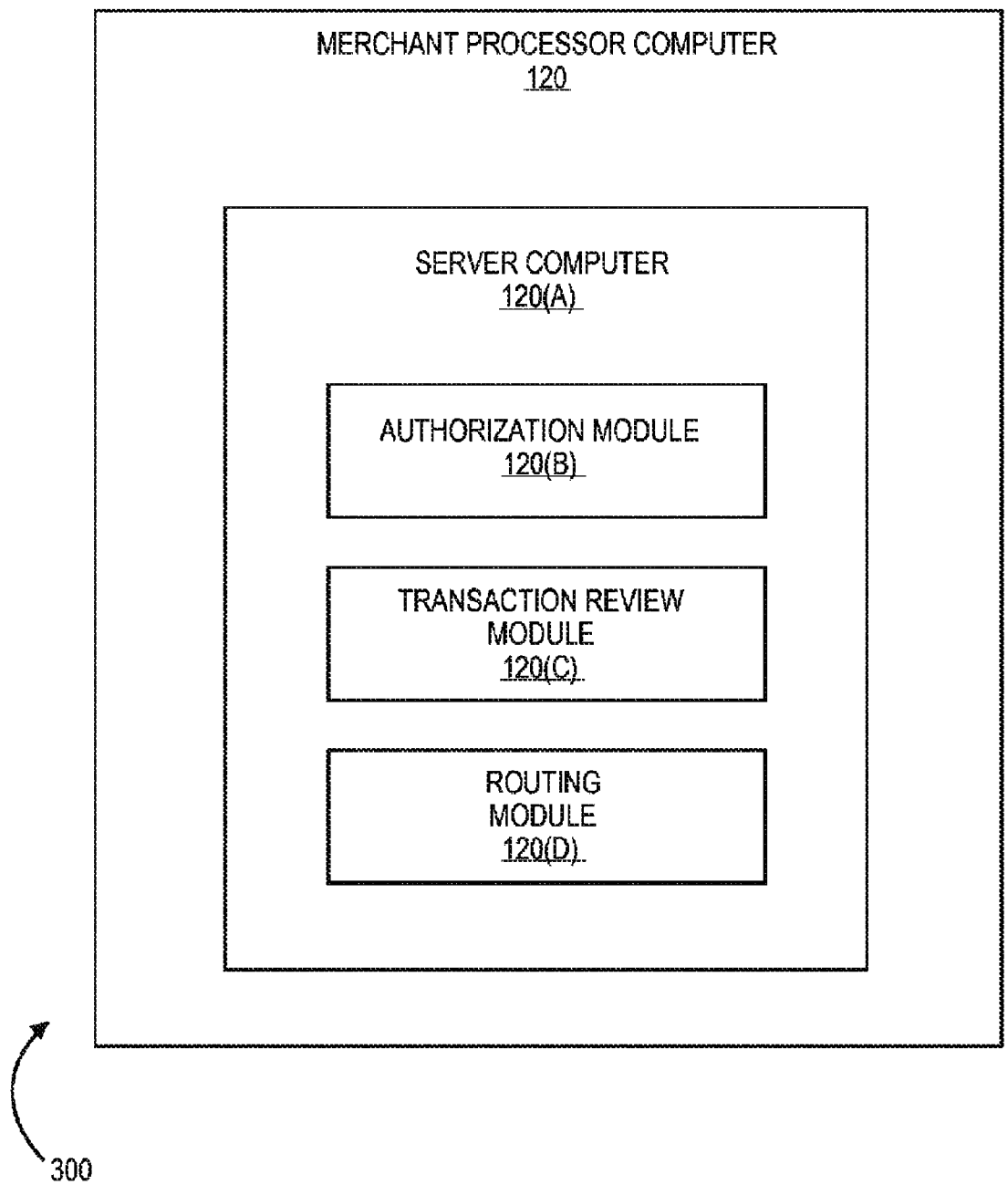
FIG. 3 shows a block diagram of components of a merchant processor computer according to an embodiment of the invention.

As depicted in FIG. 3, the merchant processor computer 120 may comprise a server computer 120(A) comprising an authorization module 120(B), a transaction review module 120(C), and a routing module 120(D). The various modules may be embodied by computer code, residing on computer readable media.

The authorization module 120(B) may generate and process authorization request and response messages. The authorization module 120(B) may also determine the appropriate destination for the authorization request and response messages. An authorization request message is a message sent requesting that an issuer computer 126 authorize a financial transaction. An authorization request message may comply with ISO 8583, which is a standard for systems that exchange electronic transactions made by consumers using payment devices. An authorization request message according to other embodiments may comply with other suitable standards. In embodiments of the invention, an authorization request message may include, among other data, a Primary Account Number (PAN) and expiration date associated with a payment device (e.g. credit/debit card) of the consumer, amount of the transaction (which may be any type and form of a medium of exchange such a money or points), and identification of a merchant (e.g. merchant ID). In embodiments, an authorization request message is generated by a server computer (if the transaction is an e-commerce transaction) or a Point of Sale (POS) device (if the transaction is a brick and mortar type transaction) and is sent to an issuer computer 126 via a payment processing network 124 and an acquirer computer 122.

The transaction review module 120(C) conducts a fraud evaluation for transactions. If the transaction review module 120(C) determines that the transaction may be fraudulent, the transaction review module 120(C) may determine that the transaction should be denied. If the transaction review module 120(C) determines that the transaction is not fraudulent, the transaction review module 120(C) may determine that the transaction should be allowed. If the transaction review module 120(C) is unable to determine whether the transaction is fraudulent, the transaction review module 120(C) can send the transaction for further review.

The routing module 120(D) can route transactions to the appropriate destination. If a transaction is determined to be not fraudulent, the routing module 120(D) can route the message to the acquirer computer 122 for further processing. If the transaction is determined to be fraudulent, the routing module 120(D) can send the transaction back to the merchant. If the fraud evaluation conducted by the transaction review module 120(C) is indeterminate, the transaction can be routed to a further review by a person.

An acquirer computer 122 is typically a system for an entity (e.g. a bank) that has a business relationship with a particular merchant or other entity. An issuer computer 126 is typically a business entity (e.g. a bank) which maintains financial accounts for the consumer 102 and often issues a consumer payment device 104 such as a credit or debit card to the consumer 102. Some entities can perform both issuer computer 126 and acquirer computer 122 functions. Embodiments of the invention encompass such single entity issuer-acquirers.

Figure 4:
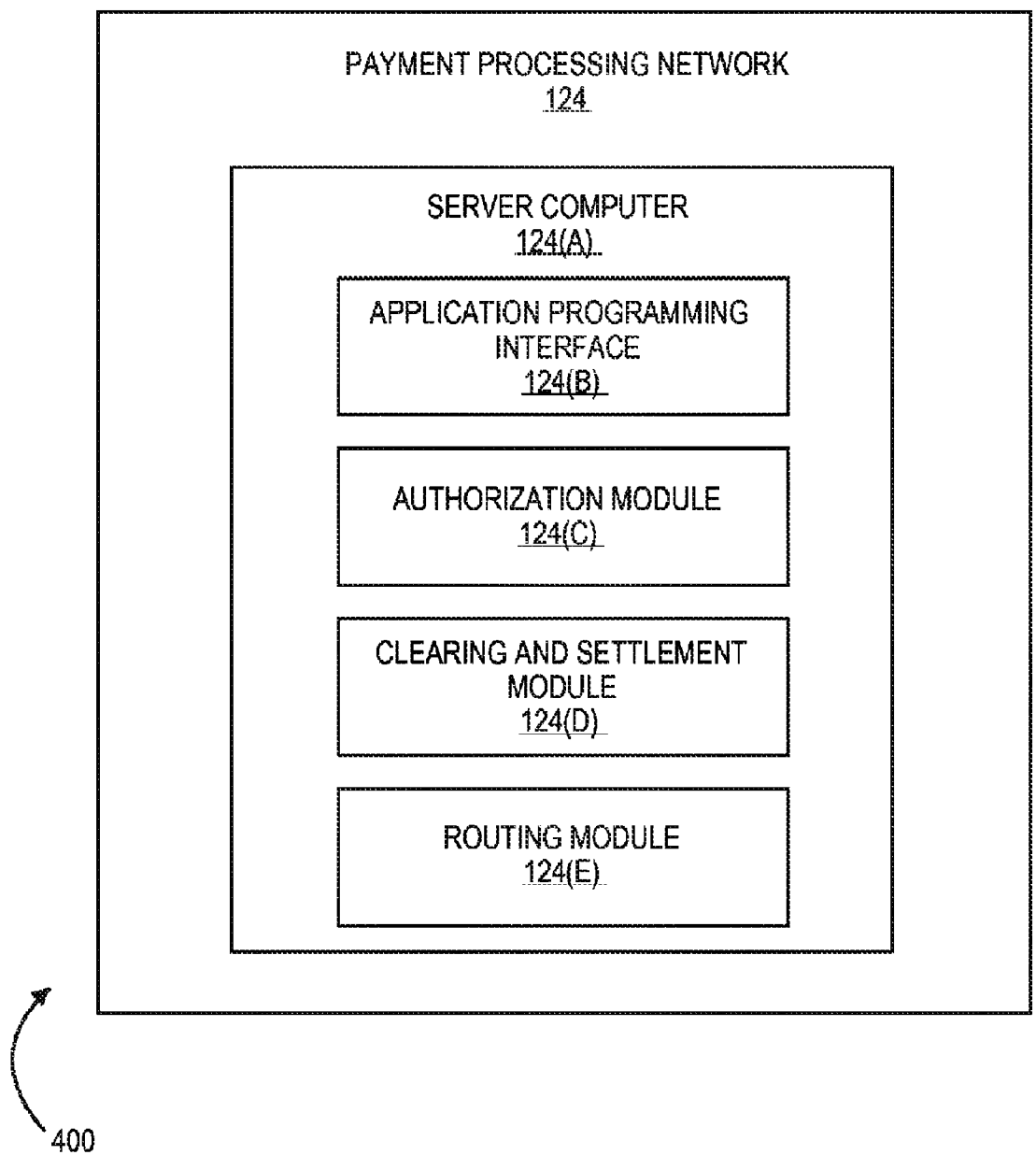
FIG. 4 shows a block diagram of components of a payment processing network according to an embodiment of the invention.

As depicted in FIG. 4, the payment processing network 124 may comprise a server computer 124(A) comprising an application programming interface 124(B), an authorization module 124(C), a clearing and settlement module 124(D), and a routing module 124(E). The various modules may be embodied by computer code, residing on computer readable media.

As noted above, the payment processing network 124 may have or operate at least a server computer 124(A). In some embodiments, the server computer 124(A) may be coupled to a database and may include any hardware, software, other logic, or combination of the preceding for servicing the requests from one or more client computers. The server computer 124(A) may comprise one or more computational apparatuses and may use any of a variety of computing structures, arrangements, and compilations for servicing the requests from one or more client computers.

The payment processing network 124 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. The payment processing network 124 may use any suitable wired or wireless network, including the Internet.

The authorization module 124(C) processes authorization request messages and determines the appropriate destination for the authorization request messages. The clearing and settlement module 124(D) handles the clearing and settlement of transactions. These modules authenticate user information and organize the settlement process of user accounts between the acquirer computer 122 and the issuer computer 126. An example of the clearing and settlement module is Base II, which provides clearing, settlement, and other interchange-related services to VISA members.

The routing module 124(E) handles the routing of authorization request messages from the acquirer computer 122 to the issuer computer 126, and the routing the authorization response messages back from the issuer computer 126 to the acquirer computer 122.

II. Methods

Methods according to embodiments of the invention can be described with respect to FIGS. 1-21.

Figure 5:
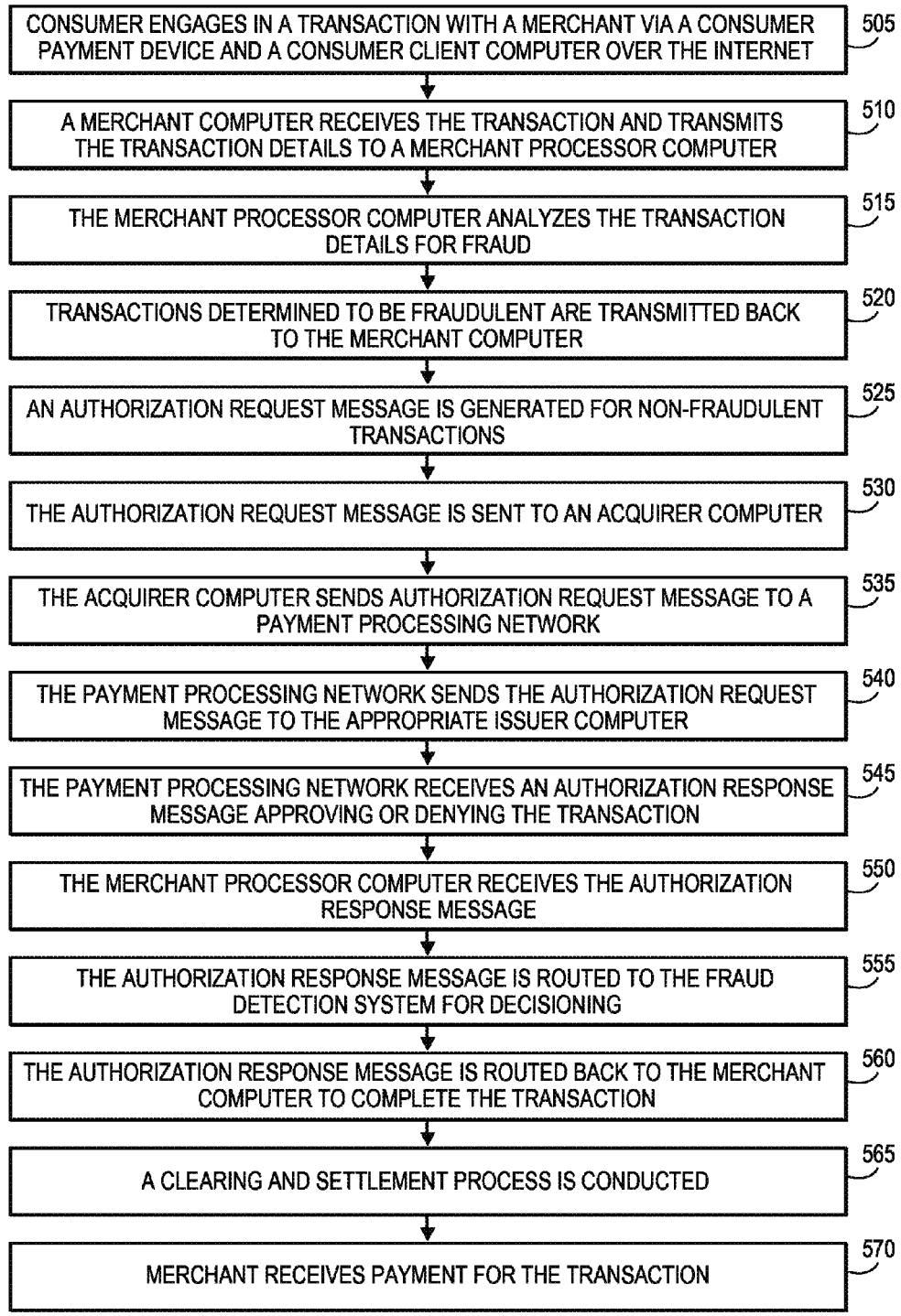
FIG. 5 illustrates a flowchart describing the process of a financial transaction according to an embodiment of the invention.

FIG. 5 is a flowchart of a method 500 for processing a transaction through a system 100 shown in FIGS. 1-4.

In step 505, in a typical transaction, the consumer 102 engages in a transaction for goods or services at a merchant associated with a merchant computer 110 using a consumer client computer 106 and a consumer payment device 104 such as a credit card or mobile phone. For example, the consumer 102 may use their Internet-enabled mobile phone to access a merchant website to conduct a transaction using their consumer payment device 104. In other embodiments, the consumer 102 may swipe the credit card through a POS terminal or, in another embodiment, may take a wireless phone and may pass it near a contactless reader in a POS terminal.

In step 510, a merchant computer 110 receives the transaction from the consumer client computer 106 and may then transmit the transaction details to a merchant processor computer 120. Transactions details may be comprised of, but is not limited to, the following: consumer name, consumer billing address, consumer shipping address, consumer phone number, consumer account number, items purchased, item prices, etc.

In step 515, the merchant processor computer 120 may conduct a fraud analysis and determine whether the transaction should proceed or whether it should be rejected and returned to the merchant computer 110. The merchant processor computer 120 may use the transaction details in determining whether the transaction may be fraudulent.

In step 520, if the merchant processor computer 120 determines that the transaction details indicate that the transaction may be fraudulent, the merchant processor computer 120 may return the transaction to the merchant computer 110 indicating that the transaction is fraudulent and should be declined.

In step 525, if the merchant processor computer 120 determines that the transaction details indicate that the transaction is not fraudulent, an authorization request message may then be generated. The authorization request message may be generated in any suitable format.

In step 530, the generated authorization request message may be transmitted by the merchant processor computer 120 to an acquirer computer 122. The authorization request message may be transmitted in any suitable format.

In step 535, after receiving the authorization request message, the authorization request message may then be transmitted to a payment processing network 124.

In step 540, after receiving the authorization request message, the payment processing network 124 may then transmit the authorization request message to an appropriate issuer computer 126 associated with the consumer payment device 104.

In step 545, the issuer computer 126 receives the authorization request message. The issuer computer 126 may then determine whether the transaction should be authorized. The issuer computer 126 transmits an authorization response message back to the payment processing network 124. The authorization response message can indicate whether or not the current transaction has been authorized or has been declined.

In step 550, the payment processing network 124 may then transmit the authorization response message back to the acquirer computer 122. The acquirer computer 122 may then transmit the response message back to the merchant processor computer 120.

In step 555, the merchant processor computer 120 may then transmit the authorization response message to a fraud detection system 118. The fraud detection system 118 may then undertake a decision process based on the authorization response message. If the result from the fraud detection system 118 is an "ACCEPT", the transaction between the merchant and the consumer 102 can be completed. If the result from the fraud detection system 118 is a "REJECT", the fraud detection system 118 would return a message to be presented to the consumer 102 that the consumer 102 may be contacted if there are any issues. For example, the consumer may receive a message stating, "Thank you for your order. We will contact you if there are any issues." In embodiments of the invention, the message does not indicate that a "REJECT" was determined for the transaction as the consumer 102 may be attempting to conduct fraudulent transactions. If the result from the fraud detection system 118 is a "REVIEW", the fraud detection system 118 would "hold" the transaction until it can be further reviewed, and it is determined whether it should be accepted or rejected.

In step 560, after the merchant computer 110 receives the authorization response message, the merchant computer 110 may then provide the authorization response message to the consumer 102. For example, the consumer 102 may be presented with a screen on the consumer client computer 106 indicating success or failure of authorization. In other embodiments, the authorization response message may be displayed by the POS terminal, or may be printed out on a receipt.

In step 565, at the end of the day or at a period determined by the merchant, a normal clearing and settlement process can be conducted. A clearing and settlement process may include a process of reconciling a transaction. A clearing process is a process of exchanging financial details between an acquirer computer 122 and an issuer computer 126 to facilitate posting to a party's account and reconciliation of the party's settlement position. Settlement involves the delivery of securities from one party to another. In some embodiments, clearing and settlement can occur simultaneously. In other embodiments, the clearing and settlement process can be conducted by the fraud detection system 118 once the fraud detection system 118 has determined that the transaction should be accepted.

In step 570, the merchant receives payment for the transaction.

Figure 6:
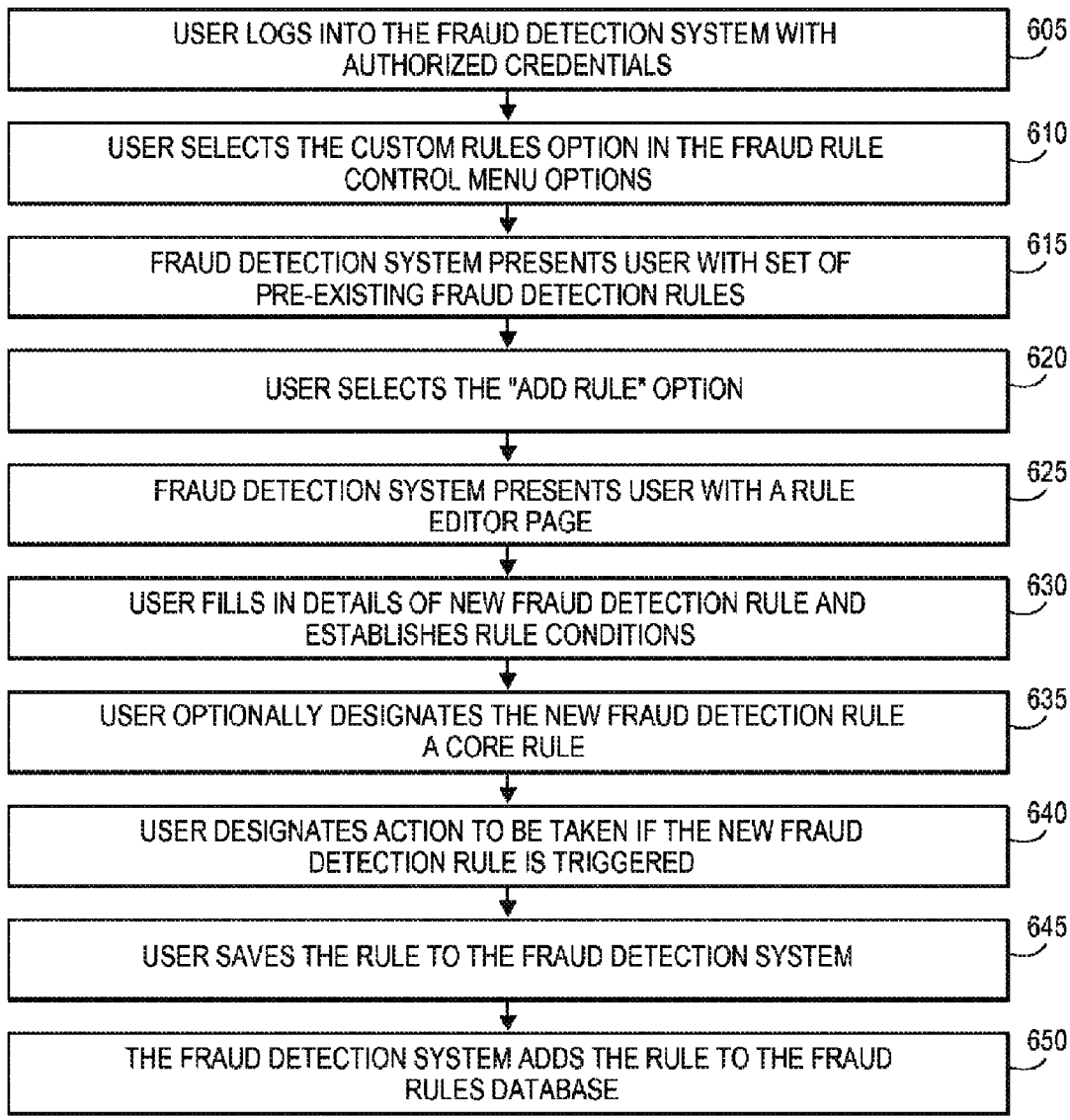
FIG. 6 illustrates a flowchart describing the creation of a new core fraud detection rule according to an embodiment of the invention.

FIG. 6 is a flowchart of a method 600 for generating and storing a new fraud detection rule through a system shown in FIGS. 1, 2, and 7-13.

In step 605, a user 112 logs into the fraud detection system 118 using authorized credentials associated with a merchant. In embodiments of the invention, the fraud detection system 118 authenticates the identity of the user 112 prior to permitting the user 112 to make modifications to a selection of fraud detection rules by verifying a login ID and password of the user 112. In embodiments, the fraud detection system 118 accesses a user authentication module 118(B) in order to authenticate the user 112. The user 112 may be a merchant, the individual who established the merchant profile or an employee of the merchant who has been given access to the fraud detection system 118. The user 112 may be an individual who has fraudulently obtained authorized credentials in order to modify the merchant profile and fraud detection rules associated with the merchant profile in order to facilitate fraudulent activity (e.g. fraudulent transactions).

Figure 7:
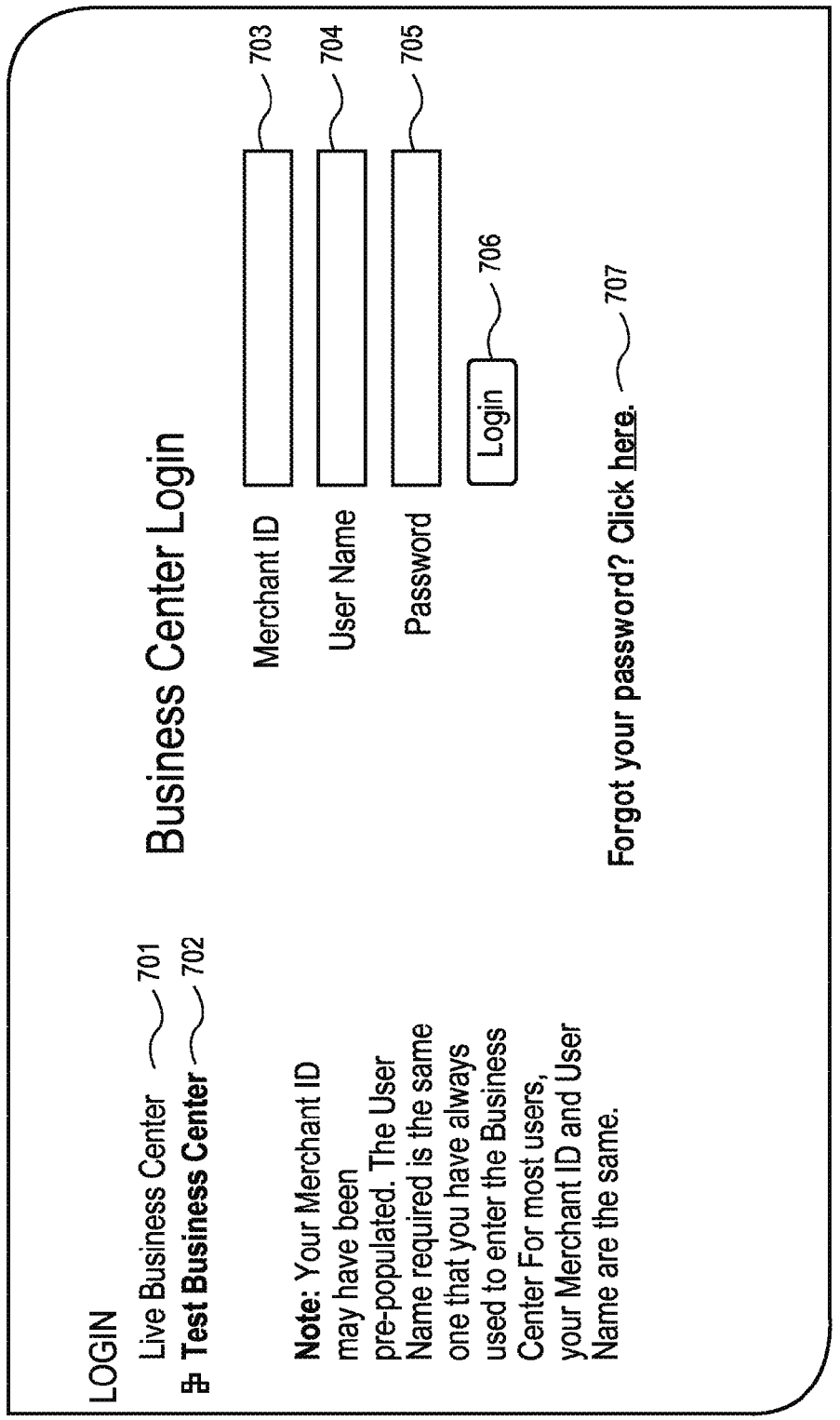
FIG. 7 shows a depiction of a user login page according to an embodiment of the invention.

FIG. 7 depicts an exemplary user login screen 700 according to an embodiment of the invention. A user 112 is provided the option of accessing a Live Business Center 701 or accessing a Test Business Center 702. Selecting the Live Business Center 701 allows the user 112 to log into a real-time run environment where actual transactions are run through the fraud detection system 118. Selecting the Test Business Center 702 allows the user 112 to log into a test environment that the user 112 can utilize to run test or simulated transactions through the fraud detection system 118.

In order to access the fraud detection system 118, the user 112 must enter authorized credentials when prompted with the login screen 700. The authorized credentials are entered in a Merchant ID field 703, a User Name field 704, and a Password field 705. Once the fields have been filled, the user 112 can select the "Login" button 706 for the credentials to be authorized. If the user 112 has forgotten their password, the user 112 can access a password recovery process by selecting the hyperlink 707.

Figure 8:
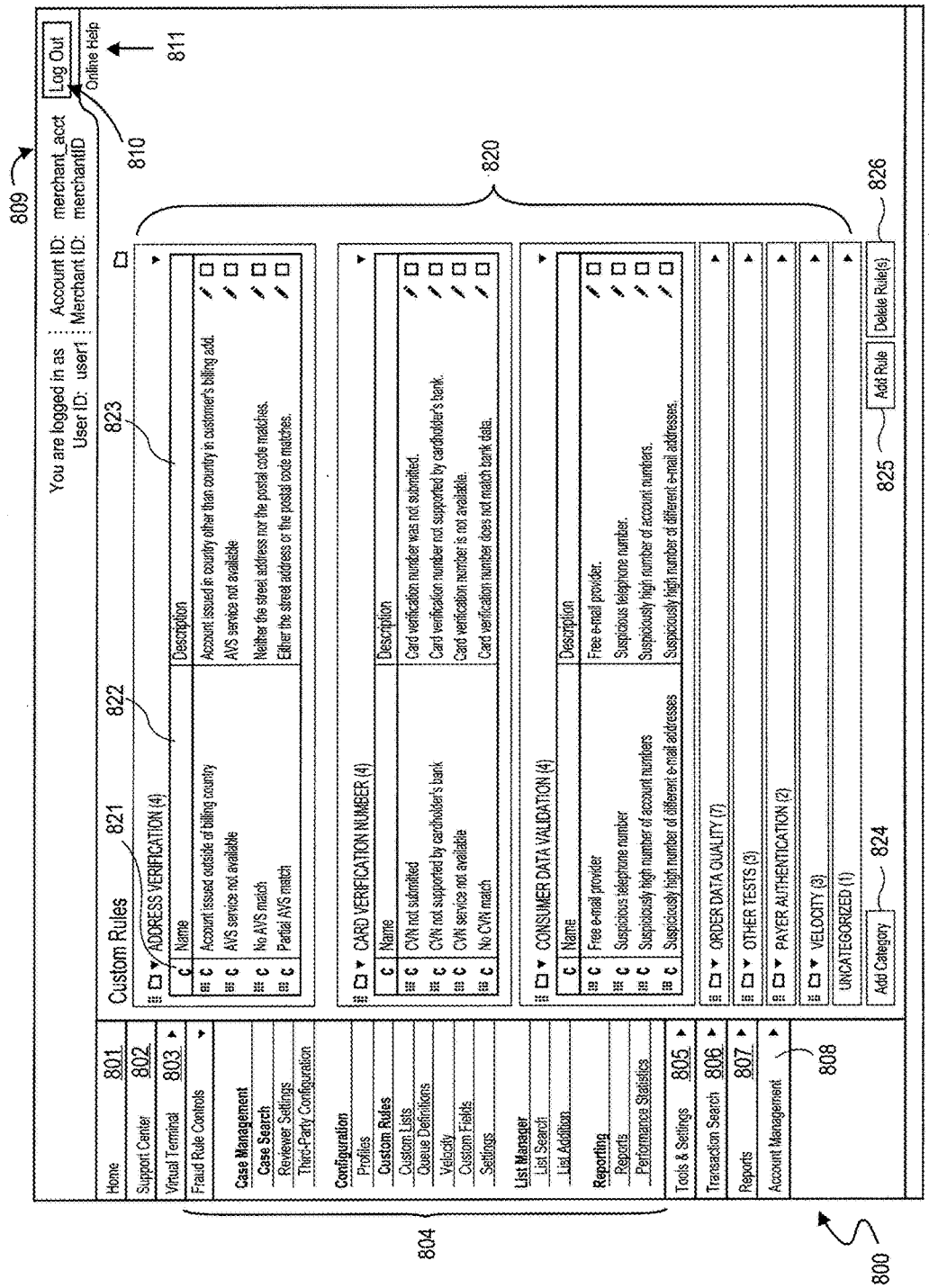
FIG. 8 shows a depiction of a custom rules page according to an embodiment of the invention.

In step 610, the user 112 selects the custom rules option from the Fraud Rule Controls menu option 804 and is taken to the Custom Rules page. FIG. 8 depicts the default Custom Rules screen 800 when a user 112 selects the "Custom Rules" option from the menu options. The left-column menu includes a selection of options for using the fraud detection system 118. Selecting the "Home" 801 option takes the user 112 to the home screen of the fraud detection system 118. Selecting the "Support Center" 802 option takes the user 112 to the Help and Support Center for the fraud detection system 118. Selecting the "Virtual Terminal" 803 option takes the user 112 to a page that the user 112 can use to simulate transactions to test the fraud detection system 118. Selecting the "Fraud Rule Controls" 804 option takes the user 112 to the fraud detection rules and merchant profile settings and controls. There the user can add, modify, or delete, fraud detection rules and/or merchant profiles. Selecting the "Tools & Settings" 805 option takes the user 112 to a variety of tools that the user 112 can use with the fraud detection system 118. Selecting the "Transaction Search" 806 option takes the user 112 to a search page that the user 112 can utilize to conduct searches for specific transactions. Selecting the "Reports" 807 option takes the user 112 to the Reports page that allows the user 112 to review different activity compiled by the fraud detection system 118 in specialized and customizable reports. Selecting the "Account Management" 808 option takes the user 112 to a variety of administrative functions including an "Audit Search" function.

Additional information and options displayed on the Custom Rules screen 800 include the login information section 809 containing the user ID, account ID, and merchant ID. The user 112 can log out of the fraud detection system 118 by selecting the "Log Out" option 810. If the user 112 wants additional help, the user 112 can select the "Online Help" option 811.

In step 615, the fraud detection system 118 presents the user 112 with a set of pre-existing (or pre-established) fraud detection rules. In embodiments of the invention, the fraud detection rules are provided by a server computer 118(A) in the fraud detection system 118. In embodiments, the fraud detection rules are received at a client computer 114. In embodiments, the fraud detection rules are retrieved from the fraud rules database 118(K) and transmitted to the client computer 114 from the server computer 118(A) by the display module 118(H). Each fraud detection rule comprises of at least one condition for triggering the fraud detection rule. The fraud detection rules are presented in categorized form. As shown in FIG. 8, there may be a plurality of fraud detection rule categories 820. Each of the fraud detection rule categories 820 has a title and indicates the number of rules contained in each of the fraud detection rule categories 820. Further, each fraud detection rule category box has a core rule indicator 821 (where a "C" character indicates that the rule is a core fraud detection rule), a fraud detection rule name field 822, and a fraud detection rule description field 823. For example, in FIG. 8, the default fraud detection rule categories include: Address Verification, Card Verification Number, Consumer Data Validation, Order Data Quality, Other Tests, Payer Authentication, Velocity and Uncategorized. Embodiments of the invention may include these categories, a combination of these categories and other categories, or other categories entirely.

In embodiments of the invention, the user 112 can use fraud detection rules provided by the fraud detection system 118 rather than create new fraud detection rules. The selection of fraud detection rules may be fraud detection rules provided by the fraud detection system 118, fraud detection rules created by the user 112, or a combination of both. The user 112 can select from the fraud detection rules provided by the fraud detection system 118, a set of fraud detection rules, where the selected set of fraud detection rules can be associated with the user 112 as a core fraud detection rule set for the user 112. Once the user 112 has established a core fraud detection rule set, the user 112 can make additional merchant profiles and the fraud detection system 118 can automatically populate the additional merchant profiles with the core fraud detection rule set.

In step 620, the user 112 selects the "Add Rule" option in order to add a new fraud detection rule to the fraud detection system 118. As shown in FIG. 8, additional options on the Custom Rules screen 800 include the option for the user 112 to "Add Category" 824, "Add Rule" 825, and "Delete Rule(s)" 826. The "Add Category" button 824 gives the user 112 the ability to create new fraud detection rule categories. The "Add Rule" button 825 gives the user 112 the ability to add new fraud detection rules to the fraud detection system 118. The "Delete Rule(s)" button 826 gives the user 112 the ability to delete one or more fraud detection rules from the fraud detection system 118. In embodiments, deleting a fraud detection rule only deletes it from the user's 112 merchant profile and not from the entire fraud detection system 118.

In step 625, the fraud detection system 118 generates and presents a Rule Editor page to the user 112. As shown in FIG. 9, the fraud detection system 118 displays a Rule Editor screen page 900 to the user 112. The Rule Editor screen page 900 includes a Rule Definition section 910 and a Rule Conditions section 920. The Rule Editor page 900 also include an "Edit Rule Configuration in Profiles" button 930, a "Save" button 931, a "Cancel" button 932, an "Apply" button 933, a "Copy Rule" button 934, and a "Delete Rule" button 935.

The Rule Definition section 910 includes text fields for rule name 911 and rule description 912, a category drop-box 913, a core rule selector box 914, and an action selector drop-box 915. The category drop-box 913 can include all the fraud detection rule categories 820 as shown in FIG. 8, and allows the user 112 to select the fraud detection rule category to place the new fraud detection rule. The core rule selector box 914 allows the user 112 to select whether to designate the new fraud detection rule as a core fraud detection rule, and the action drop-box 915 allows the user to designate an action to be taken when the core fraud detection rule is triggered. As shown in FIG. 12, embodiments of the invention the action selector drop-box 915 includes the following as possible actions: accept, reject, review, and monitor.

The Rule Conditions section 920 includes rule triggering radio boxes 921 allowing the user 112 to choose whether the fraud detection rule should be triggered as "True" if "all conditions below are true" or "at least one condition below is true." In embodiments, the user 112 can set a plurality of conditions and determine whether all or some rules should apply in order to trigger the fraud detection rule. The Rule Conditions section 920 also includes an order element drop-box 922 that allows a user 112 to select an element contained in a received transaction to evaluate for a fraud detection rule.

In step 630, the user 112 completes fields for the new fraud detection rule and establishes one or more rule conditions for the new fraud detection rule. FIG. 10 includes more details in the Rule Conditions section 1020. Once a user 112 selects an order element from the Order Element drop-box 1022, the Comparison Operator drop-box 1023, Comparison Value(s) drop-box 1024, and a Custom Value text field 1025 are presented on the Rule Editor screen page 1000 displayed to the user 112. In the example shown in FIG. 10, the Order Element is "Shipping City", the Comparison Operator is "contains," the Comparison Value(s) is "Custom Value", and the Custom Value is "Cupertino." When the user 112 selects the "OK" button 1026, the Rule Condition "Shipping city contains 'Cupertino'" will be created as a condition for the fraud detection rule to be triggered. The Rule Editor screen page 1100 in FIG. 11 shows further details for the new fraud detection rule including a new condition: "Amount (Grand Total) is greater than 500 USD. Applies to orders in all currencies." As designated by the selected radio box 1121, both conditions shown in the example of FIG. 11 must be true for the new fraud detection rule to be triggered. In embodiments, the user 112 transmits conditions for creating a new core fraud detection by the client computer 114 associated with the user 112.

In step 635, the user 112 optionally designates the new fraud detection rule a core fraud detection rule. In the example shown on the Rule Editor page 1200 in FIG. 12, the Core Rule selector box 1214 has been checked, indicating that the new fraud detection rule has been designated a core fraud detection rule by the user 112. Further, the user 112 has completed the Name text field 1211 (naming the rule "Cupertino Order") and the Description text field 1212, and selected "Consumer Data Validation" as the fraud detection rule category.

In step 640, the user 112 designates an action to be taken if the new fraud detection rule is triggered by a received transaction. As described previously, the user 112 has the option of selecting from accept, reject, review and monitor. Embodiments of the invention may include all these options, fewer than these options, or additional options. In the example shown on the Rule Editor page 1200 in FIG. 12, the user 112 has set the action selector drop-box 1215 to "Monitor."

In step 645, the user 112 saves the rule to the fraud detection system 118. Once the user 112 has completed all the fields in the Rule Editor screen page 1200, the user 112 can select to save the rule to the fraud detection system 118 by selecting the "Save" button 1231. In embodiments, the server computer 118(A) receives a selection of fraud detection rules from a client computer 114 associated with a user 112. The selection of fraud detection rules are received over a communications medium 116 (e.g. the Internet). As noted previously, the selection of fraud detection rules may be fraud detection rules provided by the fraud detection system 118, fraud detection rules created by the user 112, or a combination of both.

In step 650, the fraud detection system 118 stores the new fraud detection rule to the fraud rules database 118(K). In embodiments, if the new fraud detection rule is a core fraud detection rule, the fraud detection system stores the new fraud detection rule as part of the core fraud detection rule set in the fraud rules database 118(K). In other embodiments, the new fraud detection rule may be stored with the associated merchant profile in the merchant profiles database 118(L). Once the new fraud detection rule has been stored to the fraud detection system 118, the rule is displayed in the appropriate fraud detection rule category 1320 as shown in FIG. 13. The Custom Rules page 1300 shown in FIG. 13 shows that the "Cupertino Orders" created by the user 112 is in the Consumer Data Validation fraud detection rule category as designated by the user in FIG. 12. For the fraud detection rules that the user 112 has designated as core fraud detection rules, the server computer 118(A) in the fraud detection system 118 may associate them as a core fraud detection rule set for the user 112. Thus, when the user 112 wants to create a new merchant profile loaded with the user's core fraud detection rule set, the fraud detection system 118 can do so.

Figure 14:
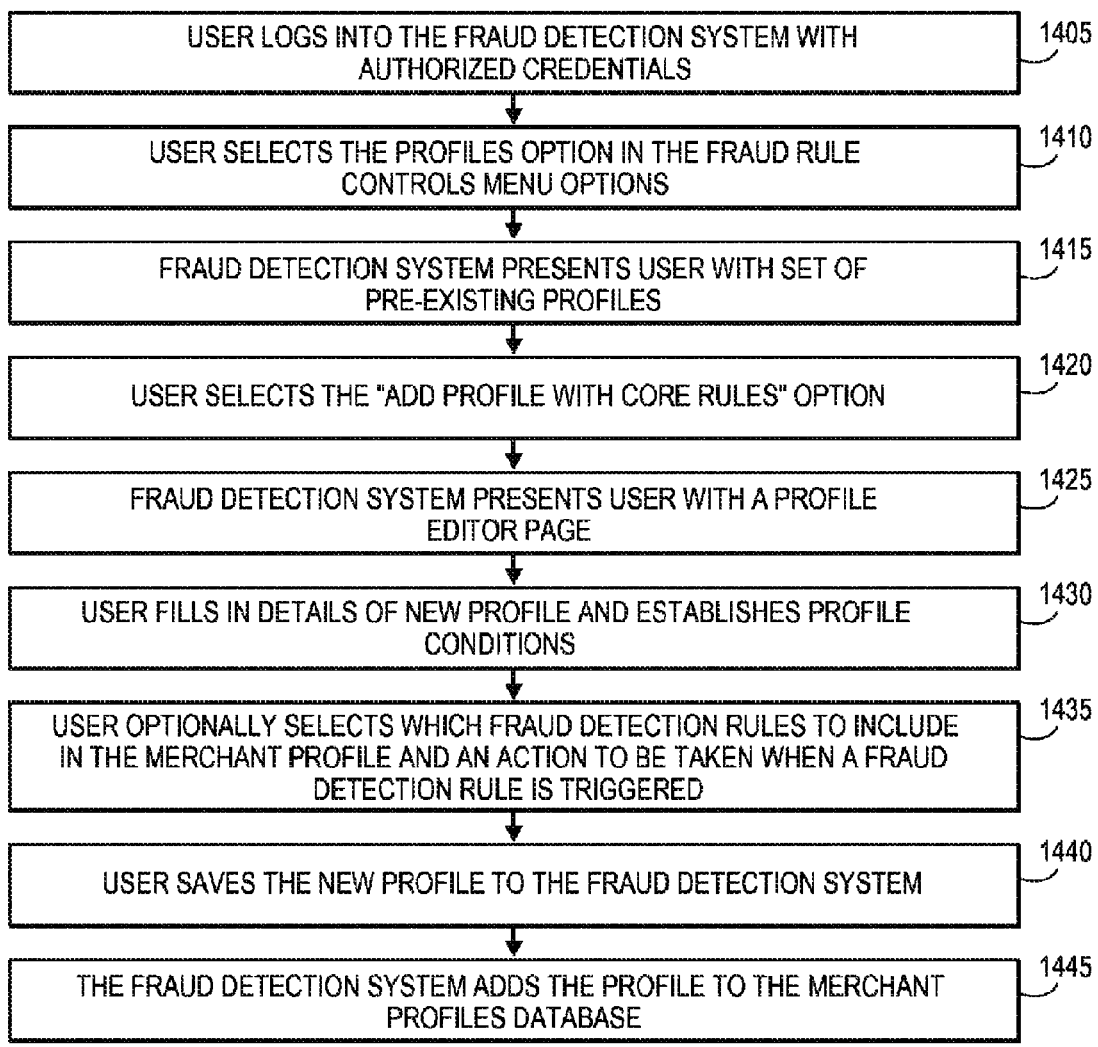
FIG. 14 illustrates a flowchart describing the creation of a new merchant profile with core fraud detection rules according to an embodiment of the invention.

FIG. 14 is a flowchart of a method 1400 for generating a new merchant profile and loading it with a core fraud detection rule set, through a system shown in FIGS. 1, 2, and 15-18.

In step 1405, a user 112 logs into the fraud detection system 118 using authorized credentials associated with a merchant. In embodiments of the invention, the fraud detection system 118 authenticates the identity of the user 112 prior to permitting the user 112 to make modifications to a selection of fraud detection rules by verifying a login ID and password of the user 112. In embodiments, the fraud detection system 118 accesses a user authentication module 118(B) in order to authenticate the user 112. The user 112 may be a merchant, the individual who established the merchant profile or an employee of the merchant who has been given access to the fraud detection system 118. The user 112 may be an individual who has fraudulently obtained authorized credentials in order to modify the merchant profile and fraud detection rules associated with the merchant profile in order to facilitate fraudulent activity (e.g. fraudulent transactions). An exemplary login screen is described above with respect to FIG. 7.

Figure 15:
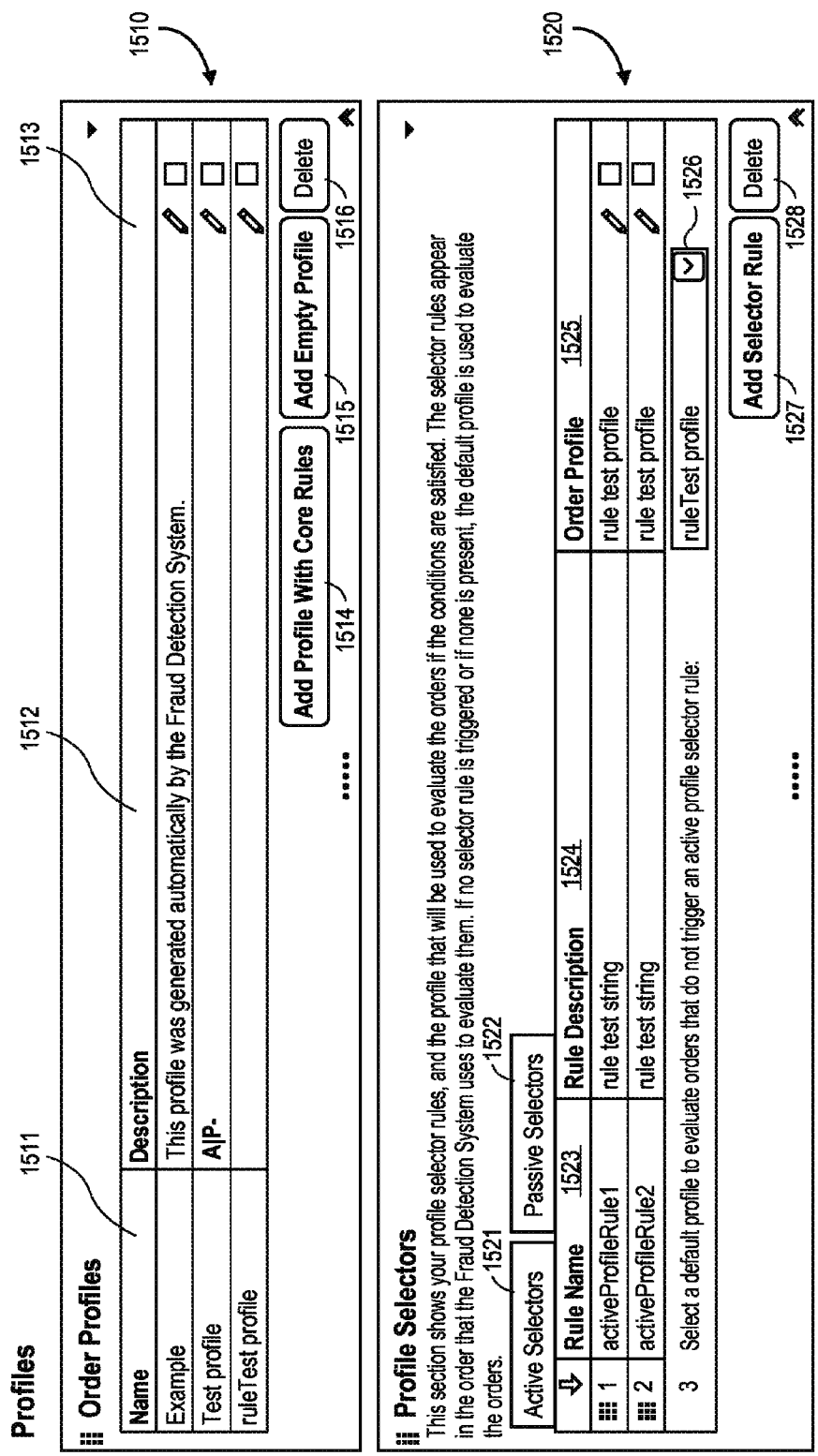
FIG. 15 shows a depiction of a profile page showing profile settings according to an embodiment of the invention.

In step 1410, the user 112 selects the Profiles option from the Fraud Rule Controls menu option 804 and is taken to the Profiles page. FIG. 15 depicts the default Profiles screen 1500 when a user 112 selects the "Custom Rules" option from the menu options. In this example, the "Order Profiles" section 1510 includes a table with a Name column 1511 and a Description column 1512, and select box options 1513. The screen also provides the option of creating a new merchant profile pre-filled with core fraud detection rules by selecting the "Add Profile With Core Rules" button 1514 or creating a new merchant profile without any fraud detection rules by selecting the "Add Empty Profile" button 1515. Merchant profiles can be deleted by selecting the corresponding select box option 1513 and selecting the "Delete" button 1516. The merchant profile named "ruleTest profile" is set as default active and passive as denoted by the "A|P" shown in the Description column 1512 in the "Order Profiles" section of FIG. 15. The "Profile Selectors" section 1520 includes a table with a Rule Name column 1523, a Rule Description column 1524, and an Order Profile column 1525. The screen also provides the option of creating a new profile selector rule by selecting the "Add Selector Rule" button 1527. Profile selector rules can be deleted by selecting the corresponding select box option and selecting the "Delete" button 1528. The "Profile Selector" section 1520 of FIG. 15 shows that the "Active Selectors" tab 1521 has been selected and again shows that the merchant profile named "ruleTest profile" is the default active merchant profile in the drop-box 1526. The "Passive Selectors" tab 1522 would similarly show that the profile named "ruleTest profile" is the default passive merchant profile.

In step 1415, the fraud detection system 118 presents the user 112 with a set of pre-existing merchant profiles. In the example shown on the Profiles screen 1500 in FIG. 15, there are three pre-existing merchant profiles: Example, Test profile, and ruleTest profile. In embodiments, a user 112 may have a plurality of merchant profiles that are directed to different business needs of the merchant. There may also be default profiles created by the fraud detection system 118 which a user 112 can select and modify to meet their business needs.

In step 1420, the user 112 selects the "Add Profile With Core Rules" option button 1514. In embodiments, the user 112 transmits, by the client computer 114 to the fraud detection system 118 via a communications medium 116, a request to generate a second merchant profile for the user. In embodiments, the request can be in the form of selecting options on an Internet-based webpage. In embodiments of the invention, selecting the "Add Profile With Core Rules" option button 1514 allows the user 112 to create a new merchant profile that is automatically populated with the fraud detection rules that have been designated as a core fraud detection rules set by the fraud detection system 118 as well as those designated as core fraud detection rules by the user 112. For example, if the user 112 created a first merchant profile following the steps described with respect to FIG. 6, the user 112 can direct the fraud detection system 118 to generate a second merchant profile that is automatically populated with the user's 112 core fraud detection rule set. In embodiments, the second merchant profile is automatically populated with the user's 112 core fraud detection rule set by the server computer 118(A) in the fraud detection system 118.

In step 1425, the fraud detection system 118 presents the user 112 with a Profile Editor Page. FIG. 16 depicts an exemplary Profile Editor screen 1600 that the user 112 can use to create a new merchant profile. A similar page would be displayed if a user 112 wanted to modify an existing merchant profile. In the embodiment shown in FIG. 16, the Profile Editor screen 1600 is comprised of four sections: a Profile Definition section 1610, a Queue Selection section 1620, a Fraud Score section 1630, and a Rule section 1640. The user can select the save button 1601, the cancel button 1602, or the apply button 1603 in order to save the merchant profile, cancel modifications to the merchant profile, or apply modifications to the merchant profile, respectively.

The Profile Definition section 1610 is composed of a Name text field, a Description text field, and a Priority drop-box.

The Queue Selection section 1620 is composed of two drop-boxes: one allows the user 112 to choose which queue to send transactions that have been marked "Review", and another allows the user 112 to choose which queue to send transactions that have been marked "Reject".

The Fraud Score section 1630 is composed of a drop-box that allows the user 112 to select a risk model for their business and establish fraud score thresholds. In embodiments of the invention, the selected risk model is used to assess the fraud score for received transactions. In the example shown in FIG. 16, the Risk Model is set to the Customer's billing country, and the fraud score thresholds are at default values (0 to 39=Ignore, 40-70=Review, and 71-99=Reject). The user 112 can adjust the sliding scale to adjust the fraud score thresholds to desired values.

Figure 17:
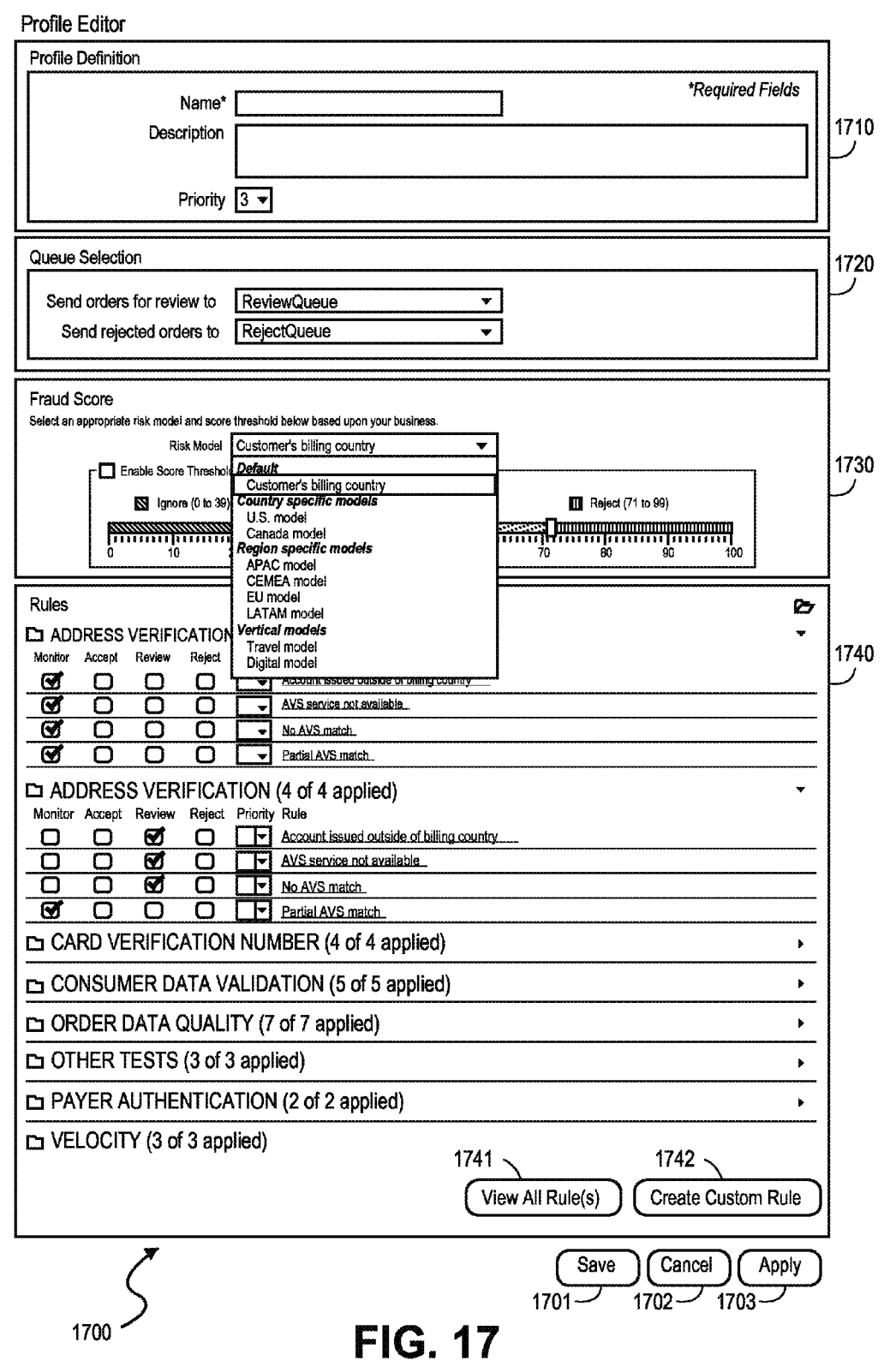

As shown in FIG. 17, risk model options may include, but are not limited to those shown in the risk model drop-box. They can include the U.S. model, the Canada model, the APAC model, the CEMEA model, the EU model, the LATAM model, the Travel model, and the Digital model. Embodiments of the invention can include these risk models, additional risk models, or fewer risk models.

The Rule section 1640 is composed of fraud detection rule categories that have been pre-loaded into the new merchant profile. As shown in FIG. 16, there are seven fraud detection rule categories: Address Verification, Card Verification Number, Consumer Data Validation, Order Data Quality, Other Tests, Payer Authentication, and Velocity. Embodiments of the invention may include these categories, a combination of these categories and other categories, or other categories entirely. The Profile Editor screen 1600 also provides the user 112 with the option to View All Rule(s) 1641 and Create Custom Rules 1642.

In step 1430, the user 112 completes the required fields and settings for a new merchant profile and establishes profile conditions. The user 112 may enter a name, profile description, queue selections, and set fraud score settings, as described above. In some embodiments, all these setting must be completed before a user 112 can be allowed to save the new merchant profile. In other embodiments, only some and not all of the setting must be completed before a user 112 can be allowed to save the new merchant profile. In the example Profile Editor screen 1700 in FIG. 17, the "Review-Queue" and "RejectQueue" have been selected as the queues to send transactions that have been marked for review and reject, respectively.

Figure 18:
FIG. 18 shows a depiction of core fraud detection rules that can be added to a new merchant profile when the merchant profile is created according to an embodiment of the invention.

In step 1435, the user 112 optionally selects which fraud detection rules to include in the merchant profile and an action to be taken when a fraud detection rule is triggered. FIG. 18 is an example of the Rule section 1640 showing fraud detection rule selections by the user 112. In some embodiments, fraud detection rules can be set to monitor, accept, review or reject by the user 112.

In step 1440, the user 112 saves the new profile to the fraud detection system 118. As shown in FIG. 17, the save button 1701 allows the user 112 to select to have the new merchant profile saved to the fraud detection system 118.

In step 1445, the fraud detection system 118 stores the new merchant profile to the merchant profiles database 118(L). Once the new merchant profile has been stored to the fraud detection system 118, the new merchant profile can be accessed and modified by selecting the "Profiles" option from the Fraud Rule Controls menu 804, as shown in FIG. 8. The merchant profile is stored in the merchant profiles database 118(L) as shown in FIG. 2.

Figure 19:
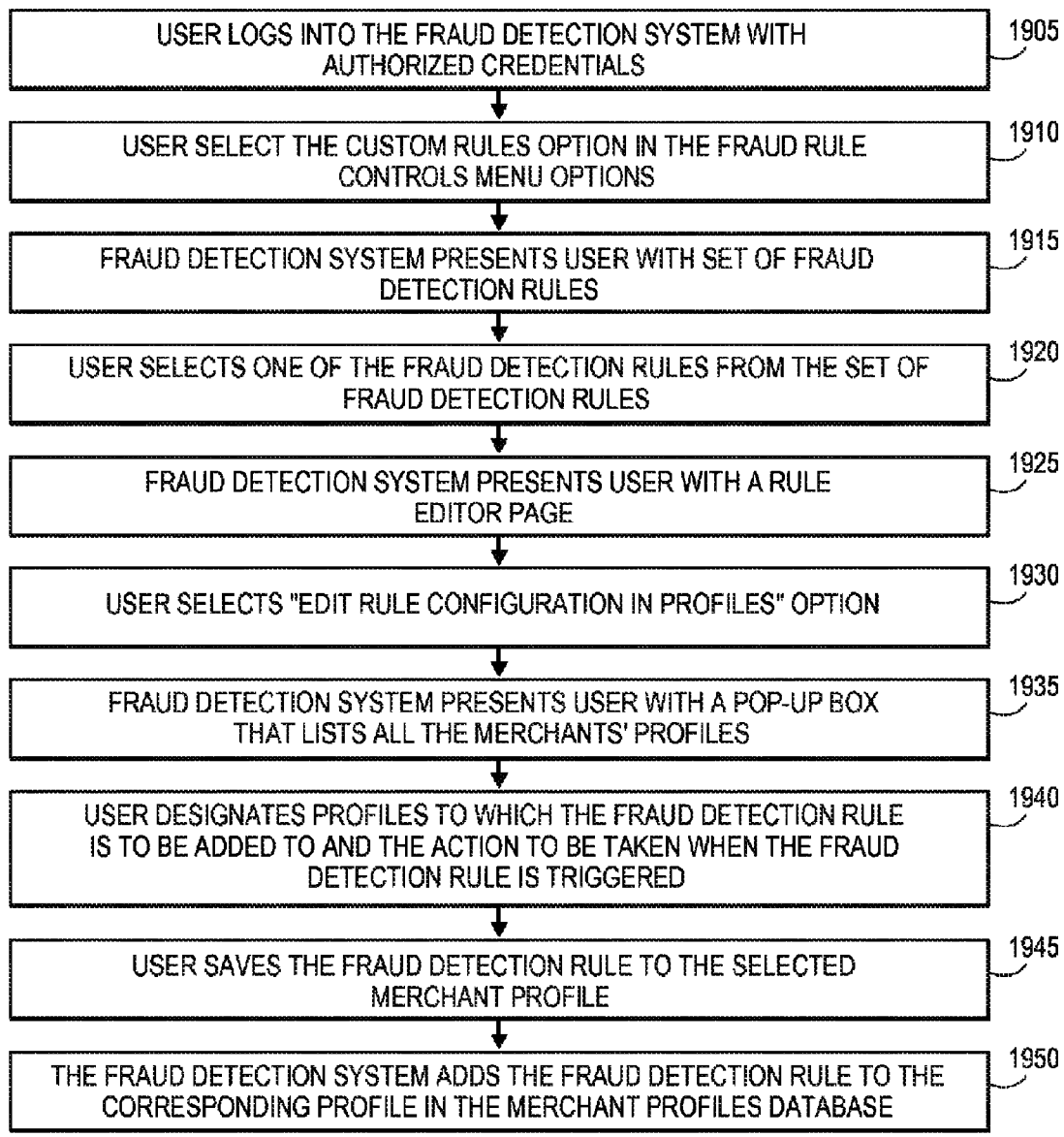
FIG. 19 illustrates a flowchart describing the addition of a new core fraud detection rule to preexisting merchant profiles according to an embodiment of the invention.

FIG. 19 is a flowchart of a method 1900 through a system shown in FIGS. 1, 2, 20 and 21 for selecting a fraud detection rule and modifying one or more merchant profiles to either add the selected fraud detection rule or remove the selected fraud detection from a profile, In step 1905, a user 112 logs into the fraud detection system 118 using authorized credentials associated with a merchant. In embodiments of the invention, the fraud detection system 118 authenticates the identity of the user 112 prior to permitting the user 112 to make modifications to a selection of fraud detection rules by verifying a login ID and password of the user 112. In embodiments, the fraud detection system 118 accesses a user authentication module 118(B) in order to authenticate the user 112. The user 112 may be a merchant, the individual who established the merchant profile or an employee of the merchant who has been given access to the fraud detection system 118. The user 112 may be an individual who has fraudulently obtained authorized credentials in order to modify the merchant profile and fraud detection rules associated with the merchant profile in order to facilitate fraudulent activity (e.g. fraudulent transactions). An exemplary login screen is described above with respect to FIG. 7.

In step 1910, the user 112 selects the custom rules option from the Fraud Rule Controls menu option 804 and is taken to the Custom Rules page. An exemplary Custom Rules page 800 is described above with respect to FIG. 8.

In step 1915, the fraud detection system 118 presents the user 112 with a set of fraud detection rules. The fraud detection rules are presented in categorized form. As shown in FIG. 8, there may be a plurality of fraud detection rule categories 820. Each fraud detection rule category has a title and indicates the number of rules contained in the fraud detection rule category. Further, each fraud detection rule category box has a core rule indicator 821 (where a "C" character indicates that the rule is a core fraud detection rule), a fraud detection rule name field 822, and a fraud detection rule description field 823. For example, in FIG. 8, the default fraud detection rule categories include: Address Verification, Card Verification Number, Consumer Data Validation, Order Data Quality, Other Tests, Payer Authentication, Velocity and Uncategorized. Embodiments of the invention may include these categories, a combination of these categories and other categories, or other categories entirely.

In step 1920, the user 112 selects one of the core fraud detection rules from the presented set of fraud detection rules. For example, the user may select the fraud detection rule named "CVN not submitted," as shown in the Custom Rules page 800 in FIG. 8.

In step 1925, the fraud detection system 118 displays the Rule Editor page for the corresponding fraud detection rule selected by the user 112. For example, the Rule Editor page screen 2000 shown in FIG. 20 shows the Rule Editor page for the fraud detection rule named "CVN not submitted." The features of the Rule Editor page were previously discussed with reference to FIGS. 9-12.

In step 1930, the user 112 selects the "Edit Rule Configuration in Profiles" option. As shown in FIG. 20, the user 112 can select the "Edit Rule Configuration in Profiles" button 2030.

In step 1935, the fraud detection system 118 displays a pop-up box to the user 112 that lists all of the merchant profiles associated with the user 112. In embodiments, the fraud detection system 118 displays a Rule Configuration in Profiles pop-up box 2110 as shown in FIG. 20. In other embodiments of the invention, the fraud detection system 118 may direct the user 112 to a separate Internet webpage, or may present the data contained in the Rule Configuration in Profiles pop-up box 2110 in any other appropriate manner.

In step 1940, the user 112 designates merchant profiles to which the selected fraud detection rules is to be added to. The user 112 also designates what action to take with respect to the fraud detection rule in each of the merchant profiles. In embodiments, the user 112 transmits a request to add the selected fraud detection rule to one or more of a plurality of merchant profiles. The data is transmitted from the client computer 114 to the server computer 118(A) in the fraud detection system 118. In embodiments, the request can be in the form of selecting options on an Internet-based webpage. The user 112 also has the option to remove the fraud detection rule from selected merchant profiles by de-selecting the action boxes in the corresponding merchant profile. In the example shown in FIG. 20, there are nine merchant profiles associated with the user 112, of which six already include the "CVN not submitted" fraud detection rule. The remaining three merchant profiles (Low Risk, Profile A, and Profile C) do not contain the fraud detection rule. In embodiments, the user 112, by the client computer, selects an action for the fraud detection rule for each of the one or more of the plurality of previously generated merchant profiles. As shown in FIG. 21, the user 112 can select to have a transaction that triggers the fraud detection rule accepted, reviewed, rejected, or monitored. The user 112 can add the fraud detection rule to none, some or all of the three merchant profiles the fraud detection rule is not in, or the user 112 can remove the fraud detection rule from none, some, or all of the six merchant profiles the fraud detection rule is currently in. In embodiments of the invention, the user 112 associates an action with the selected core fraud detection rule for each of the one or more of the plurality of previously generated merchant profiles. The user 112 has the option of selecting an action from the following: monitor, accept, reject, or review.

In step 1945, the user 112 saves the fraud detection rule to the selected merchant profile or profiles. Once the user 112 has made the desired modifications to the merchant profiles in the Rule Configuration in Profiles pop-up box 2110 in FIG. 21, the user 112 can select to save the modification to the fraud detection rule and the merchant profiles to the fraud detection system 118 by selecting the "Save" button 1231.

In step 1950, the fraud detection system 118 stores the modification to the fraud detection rule to the corresponding merchant profile in the merchant profiles database 118(L). In embodiments, the new core fraud detection rule is stored in the fraud rules database 118(L) and associated with the one or more of the plurality of previously generated merchant profiles in a merchant profiles database 118(L). In this manner, the selected fraud detection rule is associated with one or more of the previously generated merchant profiles without requiring the user 112 to individually access each merchant profile to make the modification.

III. Technical Benefits

Embodiments of the invention provide the technical benefits of efficiency and conserving resources. By establishing a set of core fraud detection rules that can be automatically populated into new merchant profiles, resources are saved as it is not necessary to access each fraud detection rule and add them one by one into a merchant profile. A merchant may require dozens of different merchant profiles to fit their business needs and it would be inefficient to require a merchant to access the fraud detection system for each fraud detection rule to be added to each merchant profile.

Additional efficiency and conservation of resources are achieved by allowing a merchant to automatically add a new core fraud detection rule to a plurality of existing merchant profiles at once. This allows a merchant to create new fraud detection rules and then be able to add that rule to any or all of the merchant's profiles without requiring the merchant to interact with each merchant profile beyond the Edit Rule Configuration in Profiles pop-up box.

Another technical benefit with embodiments of the claimed invention is a reduction in the chances of transcription errors if a set of core fraud detection rules is automatically populated in a merchant's new merchant profile. For example, a merchant may have several dozen rules that the merchant requires in a plurality of merchant profiles. Being able to generate and save a single set of core fraud detection rules, and then apply that set of core fraud detection rules uniformly across the merchant's profiles, ensures that there is uniformity across profiles.

Another technical benefit with embodiments of the claimed invention is conserving resources for transaction processing. For example, when the number or percentage of transactions that are flagged for review changes drastically (e.g., the number of transactions flagged for review goes from 10 per hour to 500 per hour), the operator of the fraud detection system can determine whether or not a change to one of the fraud detection rules caused the increase for the merchant. Adjustments can then be made to settings and conditions, allowing the merchant to conserve resources that would otherwise be expended processing transactions that do not require review. Also, if a merchant wants to add a new fraud detection rule to one or more of a plurality of merchant profiles, embodiments of the claimed invention allow the merchant to do so quickly by accessing the Edit Rule Configuration in Profiles option, rather than have to manually go into each merchant profile and make the modification.

IV. Additional Embodiments

Embodiments of the invention may include an audit trail capability. An audit trail capability is described in U.S. patent application Ser. No. 13/451,431, filed on Apr. 19, 2012. Embodiments of the invention are directed to a fraud detection system that records an audit log of modifications made by a user to a selection of fraud detection rules in a merchant profile. The audit log contains details of the modifications and the user associated with the modifications. A search can be conducted on the audit log to determine details of modifications made to a merchant profile within the fraud detection system. In this manner, by automating a search of fraud detection rule modifications, the merchant is saved the time and resources it would have to spend going through all its fraud detection rules to determine what changes may or may not have been made to its fraud detection rules and merchant profile.

Embodiments of the claimed invention may further include a profile rule performance report. A fraud detection system comprising a profile rule performance report is described in Provisional U.S. Patent Application No. 61/636,352, filed Apr. 20, 2012. Embodiments of the invention are directed to a method comprising, receiving, at a server computer, one or more transactions from a merchant processor computer, analyzing, by the server computer, the one or more transactions against a plurality of fraud detection rules contained in a merchant profile, determining, by the server computer, an action to be taken based on the analysis of the one or more transactions, receiving, at the server computer, search parameters for conducting a search of the merchant profile in the fraud detection system, generating, by the server computer, a statistical report containing results of the one or more transactions analyzed against the plurality of fraud detection rules for the merchant, and displaying, by the server computer, the statistical report. In this manner, a user can get a statistical analysis of its fraud detection rules in its merchant profiles and determine how each rule acted on the user's system. For example, a user may be able to determine whether a fraud detection rule is effectively being triggered or if a fraud detection rule is slowing the process down by unnecessary marking transaction for review.

V. Exemplary Computer Apparatuses

Figure 22:
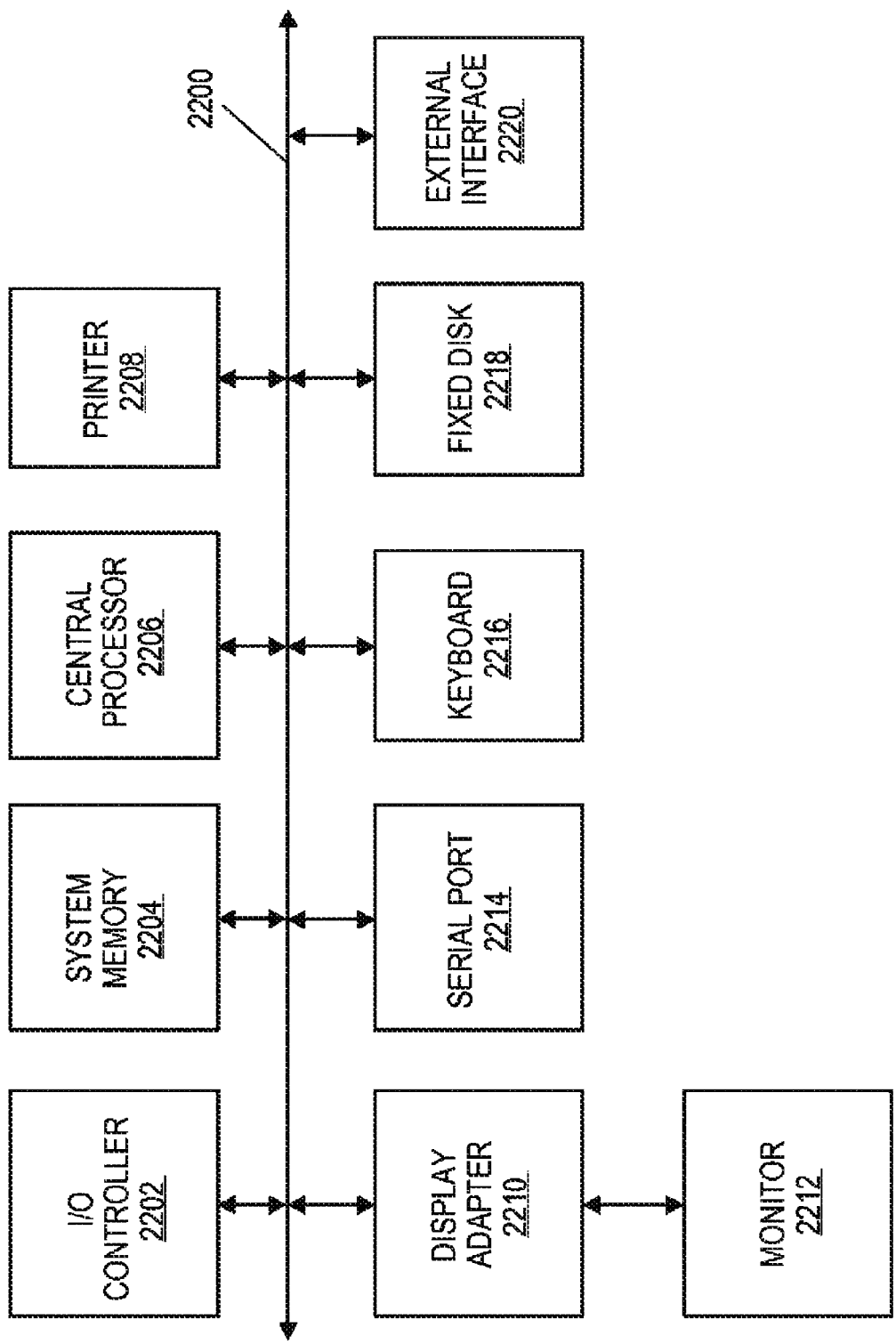
FIG. 22 shows a block diagram of a computer apparatus.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 22. The subsystems shown in FIG. 22 are interconnected via a system bus 2200. Additional subsystems such as a printer 2208, keyboard 2216, fixed disk 2218 (or other memory comprising computer readable media), monitor 2212, which is coupled to display adapter 2210, and others are shown. Peripherals and input/output (I/O) devices, which couple to I/O controller 2202, can be connected to the computer system by any number of means known in the art, such as serial port 2214. For example, serial port 2214 or external interface 2220 can be used to connect the computer apparatus to a wide area network such as the Internet, a mouse input device, or a scanner. The interconnection via system bus 2200 allows the central processor 2206 to communicate with each subsystem and to control the execution of instructions from system memory 2204 or the fixed disk 2218, as well as the exchange of information between subsystems.

The system memory 2204 and/or the fixed disk 2218 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   storing, by a server computer in memory, a plurality of existing fraud-detection rules;
   providing, by the server computer to a client computer, a first user interface for viewing the plurality of existing fraud-detection rules;
   receiving, by the server computer, a first selection of a fraud detection rule made via the first user interface;
   providing, by the server computer to the client computer, a second user interface comprising a plurality of user profiles based at least in part on the first selection;
   receiving, by the server computer, a second selection made via the second user interface, the second selection identifying a first profile of the plurality of user profiles to include the selected fraud detection rule and including an action to be taken when the selected fraud detection rule is triggered as part of applying the first profile to an authorization request;
   modifying, by the server computer, the first profile to include the selected fraud detection rule in combination with the action to be taken;
   receiving an authorization request message transmitted from a merchant access device that is associated with the first profile of the plurality of user profiles; and
   using, by the server computer, the selected fraud detection rule to process transaction details received in the authorization request message transmitted from the merchant access device to the server computer, the authorization request message transmitted between a user computer and the merchant access device using a communications network.

2. The method of claim 1, wherein the action to be taken is associated with the authorization request message for a transaction.

3. The method of claim 2, wherein the action to be taken comprises:
   monitor the transaction, accept the transaction, review the transaction, or reject the transaction.

4. The method of claim 2, wherein the action to be taken comprises:
   adjust a priority of the transaction.

5. The method of claim 1, further comprising:
   prior to using the selected fraud detection rule to process transaction details, authenticating the merchant access device.

6. The method of claim 1, further comprising:
   storing the modified first profile.

7. The method of claim 1, wherein the plurality of user profiles are populated with core fraud rules in addition to the selected fraud detection rule.

8. The method of claim 7, further comprising:
   storing the core fraud rules in a fraud rules database.

9. A server computer comprising:
   a processor; and
   a non-transitory computer-readable storage medium, comprising code executable by the processor for implementing a method comprising:
     storing, in memory, a plurality of existing fraud-detection rules;
     providing, to a client computer, a first user interface for viewing the plurality of existing fraud-detection rules;
     receiving a first selection of a fraud detection rule made via the first user interface;
     providing, to the client computer, a second user interface comprising a plurality of user profiles based at least in part on the first selection;
     receiving a second selection made via the second user interface, the second selection identifying a first profile of the plurality of user profiles to include the selected fraud detection rule and including an action to be taken when the selected fraud detection rule is triggered as part of applying the first profile to an authorization request;

modifying the first profile to include the selected fraud detection rule in combination with the action to be taken;

receiving an authorization request message transmitted from a merchant access device that is associated with the first profile of the plurality of user profiles; and using the selected fraud detection rule to process transaction details received in the authorization request message transmitted from the merchant access device to the server computer, the authorization request message transmitted between a user computer and the merchant access device using a communications network.

10. The server computer of claim 9, wherein the action to be taken is associated with the authorization request message for a transaction.

11. The server computer of claim 10, wherein the action to be taken comprises: monitor the transaction, accept the transaction, review the transaction, or reject the transaction.

12. The server computer of claim 9, wherein the method further comprising:

prior to using the selected fraud detection rule to process transaction details, authenticating the merchant access device.

13. The server computer of claim 9, wherein the method further comprising:

storing the modified first profile.

14. The server computer of claim 9, wherein the plurality of user profiles are populated with core fraud rules in addition to the selected fraud detection rule.

15. The server computer of claim 14, wherein the method further comprising:

storing the core fraud rules in a fraud rules database.

16. A client computer comprising:

a processor; and a non-transitory computer-readable storage medium, comprising code executable by the processor for implementing a method comprising:

receiving, at the client computer from a server computer, a first user interface for viewing a plurality of existing fraud-detection rules;

receiving, via the first user interface at the client computer, a first selection of a fraud detection rule;

transmitting the selected fraud detection rule to the server computer;

receiving, at the client computer from the server computer, a second user interface comprising a plurality of user profiles based at least in part on the first selection;

receiving, via the second user interface at the client computer, a second selection, the second selection identifying a first profile of the plurality of user profiles to include the selected fraud detection rule and including an action to be taken when the selected fraud detection rule is triggered as part of applying the first profile to an authorization request; and transmitting the selected first profile of the plurality of user profiles to the server computer, wherein the selected first profile is modified to include the selected fraud detection rule in combination with the action to be taken, wherein the selected fraud detection rule is used to process transaction details received in an authorization request message transmitted from a merchant access device to the server computer, the authorization request message transmitted between the client computer and the merchant access device using a communications network.

17. The client computer of claim 16, wherein the method further comprises:

transmitting, by the client computer, conditions for creating a new core fraud detection rule;

selecting, by the client computer, the new core fraud detection rule; and transmitting, by the client computer, a request to add the new core fraud detection rule to one or more of the plurality of user profiles.

18. The client computer of claim 16, wherein the action to be taken is associated with the authorization request message for a transaction.

19. The client computer of claim 18, wherein the action to be taken comprises: monitor the transaction, accept the transaction, review the transaction, or reject the transaction.

20. A method comprising:

receiving, at a client computer from a server computer, a first user interface for viewing a plurality of existing fraud-detection rules;

receiving, via the first user interface at the client computer, a first selection of a fraud detection rule;

transmitting the selected fraud detection rule to the server computer;

receiving, at the client computer from the server computer, a second user interface comprising a plurality of user profiles based at least in part on the first selection;

receiving, via the second user interface at the client computer, a second selection, the second selection identifying a first profile of the plurality of user profiles to include the selected fraud detection rule and including an action to be taken when the selected fraud detection rule is triggered as part of applying the first profile to an authorization request; and transmitting the selected first profile of the plurality of user profiles to the server computer, wherein the selected first profile is modified to include the selected fraud detection rule in combination with the action to be taken, wherein the selected fraud detection rule is used to process transaction details received in an authorization request message transmitted from a merchant access device to the server computer, the authorization request message transmitted between the client computer and the merchant access device using a communications network.

* * * * *